US009461962B2

(12) United States Patent
Sato et al.

(10) Patent No.: US 9,461,962 B2
(45) Date of Patent: Oct. 4, 2016

(54) COMPUTER SYSTEM, ADDRESS MANAGEMENT APPARATUS, AND EDGE NODE

(71) Applicant: Hitachi, Ltd., Tokyo (JP)

(72) Inventors: Katsuto Sato, Tokyo (JP); Junji Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 124 days.

(21) Appl. No.: 14/562,139

(22) Filed: Dec. 5, 2014

(65) Prior Publication Data

US 2015/0163195 A1 Jun. 11, 2015

(30) Foreign Application Priority Data

Dec. 9, 2013 (JP) ................................. 2013-253953

(51) Int. Cl.
- *H04L 12/24* (2006.01)
- *H04L 29/12* (2006.01)
- *G06F 13/42* (2006.01)

(52) U.S. Cl.
CPC ....... *H04L 61/2038* (2013.01); *G06F 13/4221* (2013.01); *H04L 41/0806* (2013.01); *H04L 61/6045* (2013.01)

(58) Field of Classification Search
CPC ...................... H04L 61/2038; H04L 41/0806; H04L 61/6045; G06F 13/4221
See application file for complete search history.

(56) References Cited

U.S. PATENT DOCUMENTS

| 8,681,695 B1* | 3/2014 | Krishnan | H04L 61/2015 370/328 |
| 2006/0007917 A1* | 1/2006 | Saito | H04L 12/4645 370/352 |
| 2006/0164975 A1* | 7/2006 | Filsfils | H04L 45/00 370/225 |
| 2012/0243403 A1* | 9/2012 | Hu | H04L 61/103 370/217 |
| 2014/0143428 A1* | 5/2014 | Zheng | H04W 12/08 709/226 |

FOREIGN PATENT DOCUMENTS

JP 5214007 B2 3/2013

OTHER PUBLICATIONS

Radhika Niranjan Mysore et al., "PortLand: A Scalable Fault-Tolerant Layer 2 Data Center Network Fabric", SIGCOMM'09, 2009.

* cited by examiner

*Primary Examiner* — Jay P Patel
(74) *Attorney, Agent, or Firm* — Volpe and Koenig, P.C.

(57) ABSTRACT

A network address management unit (210) allocates, to the first edge node, a first network address (500) on which a physical configuration of a first edge node (100a) is reflected. The network address management unit, when a second edge node (100b) is coupled to the first edge node, allocates, to the first edge node, a second network address (510) on which the physical configuration of the first edge node is reflected with respect to the second edge node. When the first edge node receives a packet that designates the first or second network address as a destination network address, the first edge node, based on the destination network address designated by the received packet, determines whether the received packet is transferred to the second edge node and discriminates a transfer destination path in the first edge node.

14 Claims, 26 Drawing Sheets

COMPUTER SYSTEM, ADDRESS MANAGEMENT APPARATUS, AND EDGE NODE

CROSS-REFERENCE TO PRIOR APPLICATION

This application relates to and claims the benefit of priority from Japanese Patent Application number 2013-253953, filed on Dec. 9, 2013, the entire disclosure of which is incorporated herein by reference.

BACKGROUND

The present invention generally relates to forwarding between nodes.

In general, a computer system has a network system including a plurality of nodes, and the plurality of nodes include a plurality of edge nodes and one or more intermediate nodes. The "intermediate node" is a node that bridges nodes, and is generally a switching apparatus such as a network switch. As used herein, bridging between nodes is called "forwarding" (or routing). The forwarding includes, for example, a process of retrieving a node (edge node or another intermediate node) serving as a forwarding destination and a process of transferring a packet (data or command) to the node found by the retrieval process. The "edge node" is a node except for the "intermediate node".

A network system in which each of a server apparatus (to be referred to as a server hereinafter) and a storage apparatus (to be referred to as a storage hereinafter) is used as an edge node is known. In general, relative to improvement of operation performance of a server, a degree of improvement of input/output performance (for example, access delay time or band width) of a storage is not high. Thus, the input/output performance has become a performance bottle neck in an entire network system. In particular, when a storage and a server are coupled to each other through a network, a speed of the network is an upper limit for the input/output performance, resulting in a bottle neck.

It is considered that, in order to improve the input/output performance, a closed network (for example, SAN (Storage Area Network)) in which a server and a storage are tightly connected to each other is configured.

However, the closed network is not capable of making an additional node participate directly in the network. This is because the "closed network" is a network not capable of coupling an additional node to any intermediate node. Examples in which "not capable of coupling an additional node to any intermediate node" include a case in which all ports of each of all intermediate nodes are in use (no intermediate nodes have a free port) or a case in which intermediate nodes are configured to be inextensible (for example, intermediate nodes are chipped to determine wiring for the intermediate nodes in advance).

When an additional node participates in a closed network, the additional node participates indirectly in the network. More specifically, an additional node is coupled to an edge node participating in a closed network (for example, when the additional node is a storage, an additional storage is coupled to a storage participating in the closed network), the edge node to which the additional node is coupled must perform forwarding. A load of forwarding performed by the edge node is desired to be as low as possible. This is because, the forwarding is not a process to be essentially performed by the edge node, and when the load of the forwarding is heavy, the performance of the process to be essentially performed by the edge node (for example, when the edge node is a storage, the process to be essentially performed is an input/output process) is deteriorated.

A similar problem may also arise in a large-scale network. When a large number of nodes participate in a network, for forwarding, a large amount of information about coupling positions of the nodes must be managed, and a transfer destination must be specified based on the large amount of information. In order to reduce the load of these processes, Patent Document 1 and Non Patent Document 1 disclose a feature that the configuration of a network is reflected on addresses associated with nodes.

[Patent Document] JP 5214007

[Non Patent Document 1] "PortLand: A Scalable Fault-Tolerant Layer 2 Data Center Network Fabric", Radhika Niranjan Mysore et al, SIGCOMM'09, 2009.

SUMMARY

In both Patent Document 1 and Non Patent Document 1, it is the intermediate node such as a switching apparatus (for example, a router apparatus) that performs forwarding. Thus, even though the load of forwarding becomes heavy, the edge node is rarely directly influenced. An additional node need only be coupled to the intermediate node.

However, in a closed network, since an additional node must be coupled to any one of edge nodes, the load of forwarding may consequently influence the performance of the edge node to which the additional node is coupled. The load of forwarding mainly includes a process of determining whether a received packet is a packet to be transferred and a process of specifying a transfer destination when the packet must be transferred. For these processes, in general, a transfer management table (may be called a "routing table") showing a corresponding relationship between a network address designated as a destination and a transfer destination) is necessary. For the transfer management table, a region for storing the transfer management table must be secured. In addition, an edge node performing forwarding must determine a process with reference to the transfer management table each time a packet is received.

In order to solve such a problem, the edge node performs forwarding without the transfer management table. More specifically, a network address management unit is included. The network address management unit allocates, to the first edge node, a first network address on which a physical configuration of a first edge node is reflected. The network address management unit, when a second edge node is coupled to the first edge node, allocates, to the first edge node, a second network address on which the physical configuration of the first edge node is reflected with respect to the second edge node. When the first edge node receives a packet that designates the first or second network address as a destination network address from a third edge node, the first edge node is capable of determining, based on the destination network address designated by the received packet, whether the received packet is transferred to the second edge node and discriminate a transfer destination path in the first edge node.

The network address management unit, for example, may be included in an intermediate node in the network system or included in a management apparatus that manages each of the edge nodes. In this case, it is possible to call an apparatus such as the intermediate node or the management apparatus having the network address management unit, as an address management apparatus.

In the first edge node, a region for a transfer management table becomes unnecessary, and the transfer management table also need not be referred to each time a packet is received. Thus, it is possible to reduce a decrease performance of a process to be essentially performed by the first edge node.

BRIEF DESCRIPTION OF THE DRAWINGS

FIG. 14 shows an operation flow of a storage after power is turned on.

FIG. 18 shows an operation flow of a switch after power is turned on.

FIG. 19 shows an operation flow of a server after power is turned on.

DESCRIPTION OF EMBODIMENTS

Hereinafter, some embodiments will be described with reference to the drawings.

In the following embodiments, it is noted that a closed network is a closed SAN and a network address is called a "port ID". The port ID (normal port ID and proxy port ID which will be described later) may be a port ID of a Fibre Channel network. In a closed SAN, it is assumed that server apparatuses (to be referred to as servers hereinafter) and storage apparatuses (to be referred to storages hereinafter) are mixed as edge nodes, an additional node is a storage, an additional storage is coupled to any one of the storages, and the storage to which the additional storage is coupled performs forwarding. However, an additional server may be coupled to any one of the servers, the server to which the additional server is coupled may perform forwarding by the procedure similar to that of the forwarding performed in the storage.

In the following description, reference numbers assigned to elements of the same type include sub-symbols different from those of common main numbers. When the elements of the same type are distinctively explained, all reference numbers may be used (for example, a server (300a) and a server (300b)). When the elements of the same type are explained without distinction, only common main numbers of the reference numbers may be used (for example, a server (300)).

In the following description, although numbers are used as pieces of identification information (IDs) of elements (storages, paths, or the like), pieces of information of different types may be used as IDs in place of or in addition to the number. In the following description, a closed SAN may be simply referred to as an "SAN".

In the following description, the "path" denoted by a path number may be a bus, or a device on a bus in place of or in addition to a bus.

Figure 1:
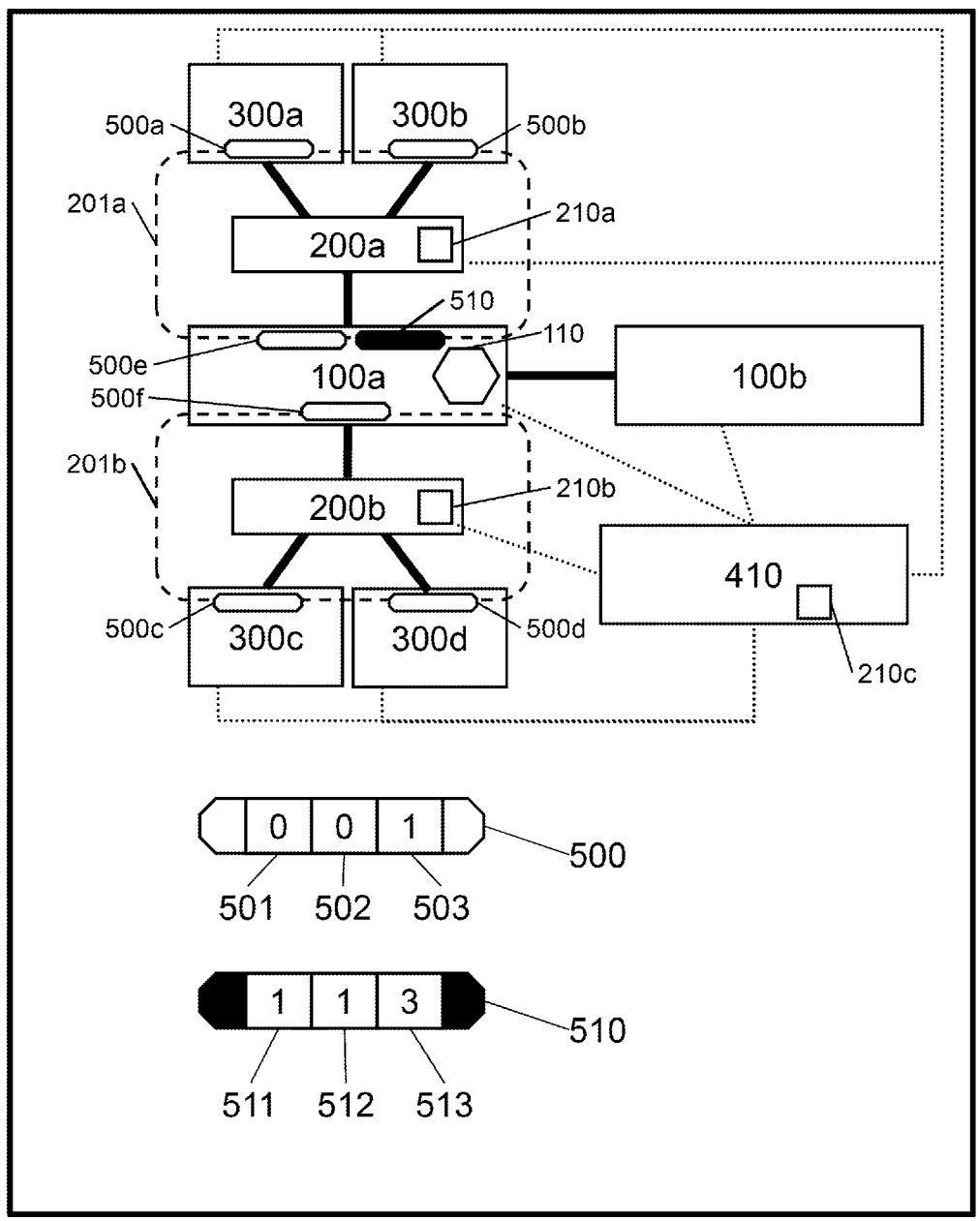
FIG. 1 shows a concept common to a plurality of embodiments.

FIG. 1 shows a concept common to a plurality of embodiments.

As edge nodes, there are a server (300a) and a storage (100), and as a relay node, there is a switching apparatus (to be referred to as a switch hereinafter) (200). A closed SAN (201a) is configured by servers (300a and 300b), a storage (100a), and a switch (200a) to which the servers and the storage are coupled. A closed SAN (201b) is configured by servers (300c and 300d), the storage (100a), and a switch (200b) to which the servers and the storage are coupled.

There also are a port ID allocation unit (210) and a forwarding unit (110). The port ID allocation unit (210) may be arranged in each of the switches (200a, 200b) (210a, 210b), or may be arranged in a management apparatus (410) communicably coupled to each of the servers (300) and each of the storages (100) (210c). The forwarding unit (110) is arranged in at least the storage (100a) to which an additional storage (100b) is coupled. At least one of the port ID allocation unit (210) and the forwarding unit (110) may be a function achieved by executing a program with a processor, may be achieved by both of such a processor and dedicated hardware, or achieved by only the dedicated hardware.

As port IDs, in addition to a normal port ID (500), a proxy port ID (510) is set. The normal port ID (500) is a port ID addressed to an edge node participating in the closed SAN (201), for example, the storage (100a), and the proxy port ID (510) is a port ID addressed to an additional node, for example, a port ID addressed to the additional storage (100b).

Figure 8:
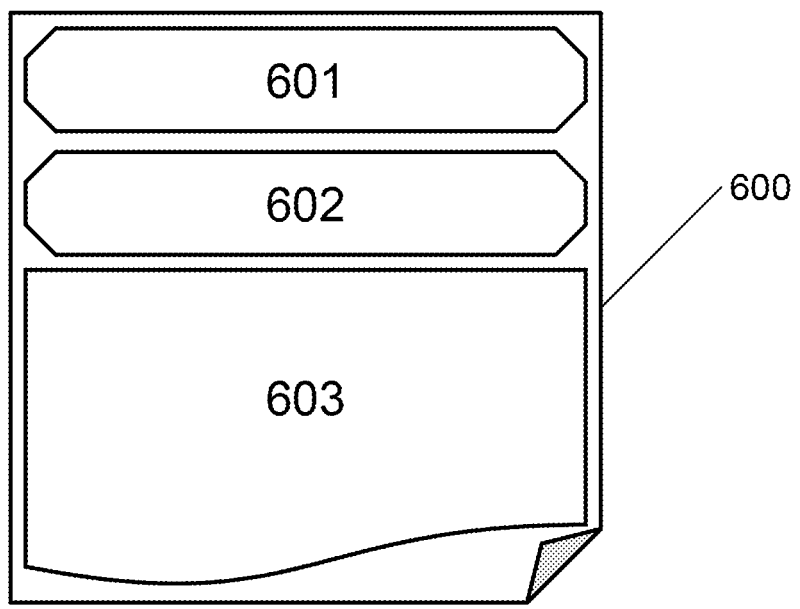
FIG. 8 shows a configuration of a packet.

Both the port IDs (500, 510) include at least three elements, i.e., storage numbers (501, 511), path numbers (502, 512), and unique numbers (503, 513). More specifically, the port IDs (500, 510) have a field in which the storage numbers (501, 511) are set, a field in which the path numbers (502, 512) are set, and a field in which the unique numbers (503, 513) are set. The storage numbers (501, 511) are identification numbers of the storages (100), the path numbers (502, 512) are identification numbers of paths in the storages (100), and the unique numbers (503, 513) are unique numbers (non-overlapping numbers) in a closed SAN (201) to which the switches (200) are coupled (for example, the unique number is a number that is updated (for example, incremented) each time a port ID is generated). Since the unique number is included in a port ID, an overlapping port ID is not present in the closed SAN (201). It is noted that when each of an additional node and an edge node to which the additional node is coupled may not be storages respectively, a storage number may be a node number. The port ID may include an identification number representing a node type. An order of the numbers (501) to (503) in the port ID (500) may be equal to or different from an order of the numbers (511) to (513) in the proxy port ID (510). In the latter, each of the port IDs (500, 510) may include an identification number representing the type of a port ID. In the following embodiments, the order of the numbers (501) to (503) in the port ID (500) is equal to the order of the numbers (511) to (513) in the proxy port ID (510), the storage number of the storage (100a) is "0", and the storage number of the storage (100b) is "1". Depending on the difference between these numbers, it is possible to determine whether the forwarding unit (110) transfers a received packet (600) (see FIG. 8) to the storage (100b). It is noted that the packet (600) includes a destination region (601), a sending source region (602), and a data region (603). The port ID (500 or 510) serving as a destination is set to the destination region (601), the port ID (500) allocated to an apparatus that transmits the packet (600) is set to the sending source region (602), and data or a command is set to the data region (603).

The port ID allocation unit (210) generates the port ID (500) as described below. More specifically, the port ID allocation unit (210) acquires the storage number of the storage (100a) coupled to the SAN (201) and the path number of a path linked to the SAN (201) in the storage (100a). The acquired storage number and the acquired path number are incorporated as the storage number (501) and the path number (502) in the port ID (500) allocated by a normal port ID allocation operation. In addition, the port ID allocation unit (210) generates a number that is unique in the SAN (201) to which the switch (200) is coupled, and includes the number in the port ID (500) as a unique number (503). The normal port IDs (500) are allocated to the servers (300a to 300d), respectively, (500a to 500d), and allocated to the storage (100a) (500e and 500f). It is noted that the allocation of the normal port ID (500) may be performed in response to an allocation request of a normal port ID. The allocation request is an example of a first allocation request.

The port ID allocation unit (210) generates the proxy port ID (510) as described below. More specifically, the port ID allocation unit (210) receives, from the storage (100a), a port ID allocation request (to be referred to as a special allocation request hereinafter) to which a transfer destination storage number and a path number of a path to (with) which the transfer destination storage (100b) is coupled are designated (associated), and, in response to the special allocation request, allocates, to the transmission source storage (100a) of the special allocation request, the proxy port ID (510) including the transfer destination storage number (511) and the path number (512) of the path to which the transfer destination storage (100b) is coupled. It is noted that the special allocation request is an example of a second allocation request.

When the storage (100a) is set to perform forwarding to another storage (100b) that is not coupled to the closed SAN (201), the storage (100a) transmits the above-described special allocation request to an apparatus including the port allocation unit (210), i.e., the switches (200a, 200b) of all the SANs (201a, 201b) to which the storage (100a) belongs or the management apparatus (410). The port allocation unit (210) generates the proxy port ID (510) including a transfer destination storage number (511) and the path number (512)designated by the special allocation request, and a number (513) that is unique in the SAN (201), and allocates the proxy port ID (510) to the transmission source storage (100a) of the special allocation request.

When the storage (100a) receives the packet (600), the forwarding unit (110) determines whether a destination port ID (port ID in a destination region (601)) of the packet (600) is a normal port ID (500) or a proxy port ID (510) based on a storage number in the port ID. In order to make the determination easy, a position (offset from the head of the port ID (500)) of the storage number (501) of the normal port ID (500) and a position (offset from the head of the proxy port ID (510)) of the transfer destination storage number (511) of the proxy port ID (510) may match with each other.

When the forwarding unit (110) determines that the destination port ID of the received packet (600) is the normal port ID (500) and when the destination port ID matches with a normal port ID (500e or 500f) allocated to its own storage (100a), the forwarding unit (110) determines that the received packet (600) is a request to its own storage (100a).

When the forwarding unit (110) determines that the destination port ID of the received packet (600) is the normal port ID (500) and when the destination port ID does not match with any one of the normal port IDs (500e, 500f) allocated to its own storage (100a), the forwarding unit (110) determines that the packet (600) is transmitted to a server (300c or 300d) in another SAN (201b), acquires the path number (502) from the destination port ID (normal port ID (500)), and transfers the packet (600) through a path coupled to the path number (502).

When the forwarding unit (110) determines that the destination port ID of the received packet (600) is the proxy port ID (510), the forwarding unit (110) acquires the path number (512) from the destination port ID (proxy port ID (510)) and transfers the packet (600) to the apparatus (i.e., the storage (100b)) coupled to a path represented by the path number (512).

According to the above processes, the storage (100a) determines, based on a storage number in the destination port ID included in the received packet, whether the packet is processed by its own storage (100a) or transferred to another storage to make it possible to discriminate a transfer destination based on a path number in the destination port ID. More specifically, the storage (100a) is capable of performing forwarding without a transfer management table. Thus, a load of forwarding is light, and it is therefore possible to reduce a decrease of input/output performance of the storage (100a). In the storage (100a), a region for storing the transfer management table need not be secured.

It is noted that in the closed SAN (201a), when the proxy port ID is allocated to the storage (100a), a predetermined notification (notification of port ID state change) is transmitted to all the other edge nodes in the closed SAN (201a). The edge nodes (servers (300a and 300b) here) that receive the notification request a port ID list to the switch (200a) (or the management apparatus (410)) to make it possible to recognize the allocated proxy port ID described above.

Thereafter, the servers (300a and 300b) is capable of transmitting a packet using the proxy port ID as the destination port ID.

The configuration of the port ID is unique (not overlapping) in the closed SAN (201), and is a configuration on which the physical configuration of the storage (100a) is reflected. As an example, as described above, the port ID includes a storage number, a path number, and a unique number. Since the unique number is unique in the closed SAN (201), the port ID is secured to be unique in the closed SAN (201). Based on the path number, a transfer destination path (device) of a packet (or a command in a packet) is uniquely specified. Based on the storage number, it is possible to determine whether a command in a packet is taken out and processed by its own storage or the packet is transferred to another storage.

The above is a concept common to a plurality of embodiments. Each of the embodiments will be described below in detail.

First Embodiment

Figure 2:
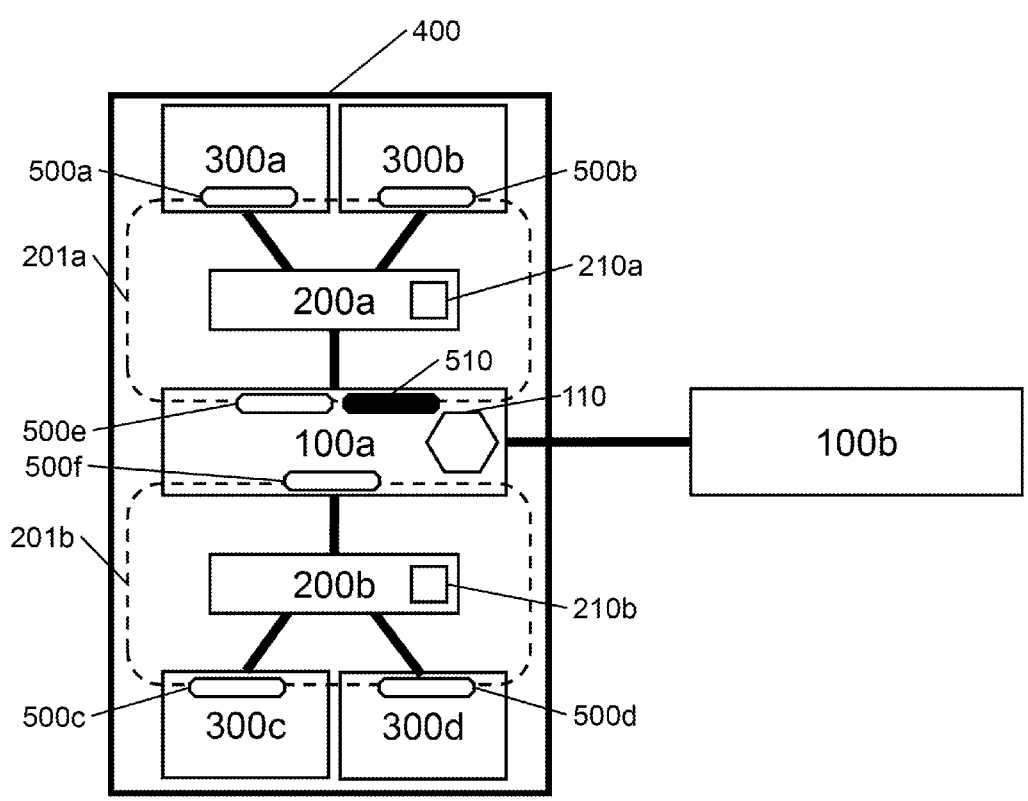
FIG. 2 shows a configuration of a computer system according to a first embodiment.

FIG. 2 shows a configuration of a computer system according to a first embodiment.

In one server storage system housing (400), the storage (100a) and two or more servers (300a to 300d) are coupled to each other by one or more closed SANs (201a and 201b). It is not possible to draw the SAN (201) out of the housing (400), and it is not possible to couple servers to the SAN (201) if the number of servers to be coupled is larger than a number determined by design in the housing (400).

Figure 3:
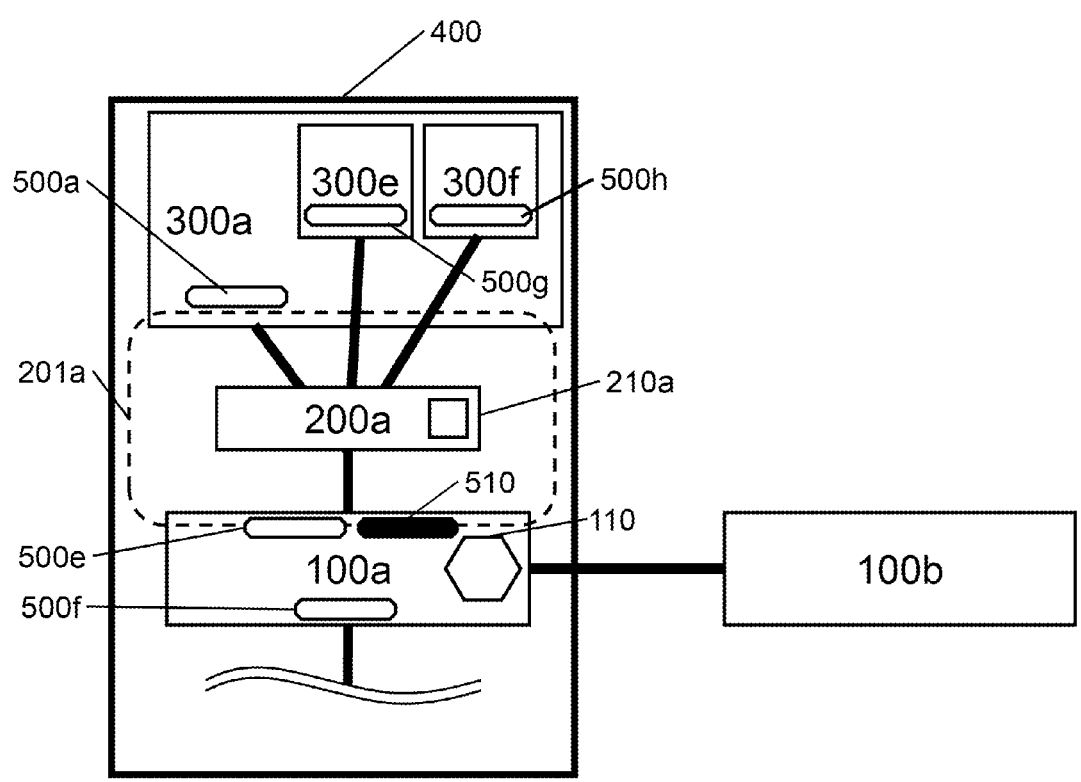
FIG. 3 shows a configuration of a modification of a computer system according to a first embodiment.

The servers (300) may be physical servers or, as shown in FIG. 3, virtual servers (300e, 300f) in the physical server (300a). In FIG. 3, only one SAN is shown, and another SAN and a switch and a server that are coupled to the SAN are omitted. The switches (200) in the SAN may be virtual switches. The virtual switch may be virtually achieved in a server, or virtually achieved on another apparatus that is physically present outside the server. In place of or in addition to the servers (300), the storages (100) are also not limited to physical storages, and may be virtual storages (for example, virtual storages generated by logically sectioning a physical storage).

The port ID allocation units (210) are arranged in the switches (200a, 200b) (210a, 210b).

An operation performed in the first embodiment will be described with reference to a configuration example in FIG. 2. Since this operation is equally executed on all the SANs (201a, 201b) coupled to the storage (100a), in FIG. 3 or later, one SAN (201a) is shown, and the other SAN (201b) is omitted.

<First Operation Example>Allocation of Normal Port ID in Basic Configuration

Figure 4:
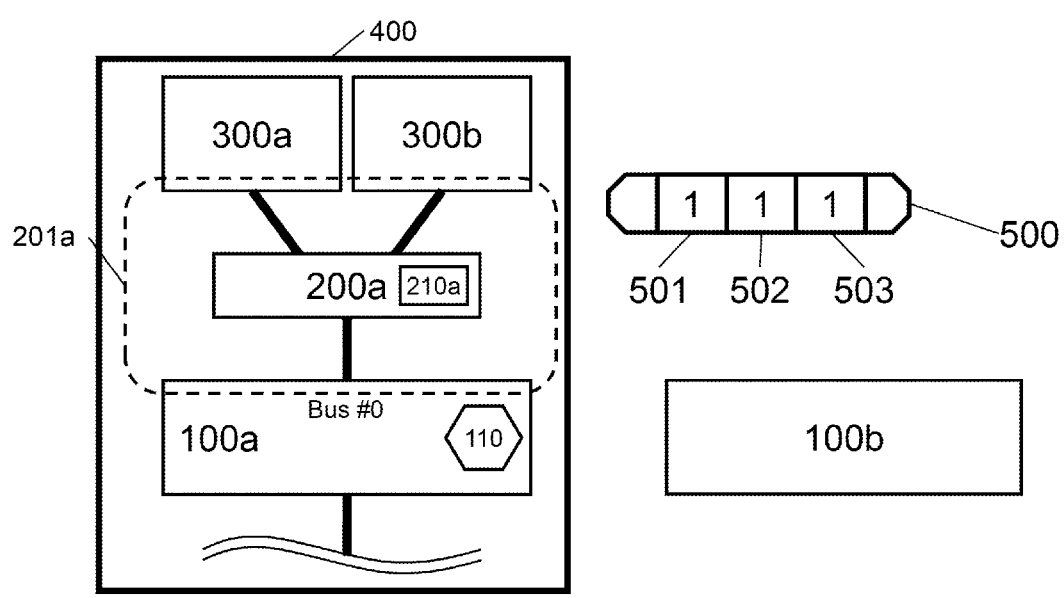
FIG. 4 shows an initial state.

FIG. 4 shows an initial state, i.e., a state in which the additional storage (100b) has not been coupled to the storage (100a), and port IDs are not allocated to the servers (300a, 300b) and the storage (100a) in the closed SAN (201a). In this state, an operation of allocating the normal port ID (500) to the server (300) and the storage (100) will be described below.

(1.1) The port ID allocation unit (210a) mounted on the switch (200a), before an operation of allocating port IDs is started, acquires the storage number of the storage (100a) coupled to the switch (200a) and a path number for identifying an input/output path to the SAN (201a) in the storage. For example, the storage (100a) notifies the switch (200a) of the storage number and the path number. When the storage (100b) that will be a forwarding destination later is coupled, the storage number must be a unique number by which it is possible to discriminate the two or more storages (100a, 100b) from each other. Before an operation of allocating a port ID to the storage (100a) is started, the port ID allocation unit (210a) receives, from the storage (100a) (or the above-described management apparatus (410)), the storage number of the storage (100a) and the path number of a path (path coupled to the switch (200a)) in the storage (100a). In this example, the storage number of the storage (100a) is defined as "0", and the path number of the path coupled to the switch (200a) is defined as "0".

(1.2) The port ID allocation unit (210a) sets a storage number "0" to the normal port ID (500) as the storage number (501), and sets a path number "0" as the path number (502). Upon completion of the setting, the switch (200a) (port ID allocation unit (210a)) starts an operation of accepting port ID allocation (for example, acceptance of an allocation request of a port ID).

(1.3) The servers (300a, 300b) and the storage (100a) coupled to the SAN (201a), respectively, transmit allocation requests of port IDs to the switch (200a).

Figure 5:
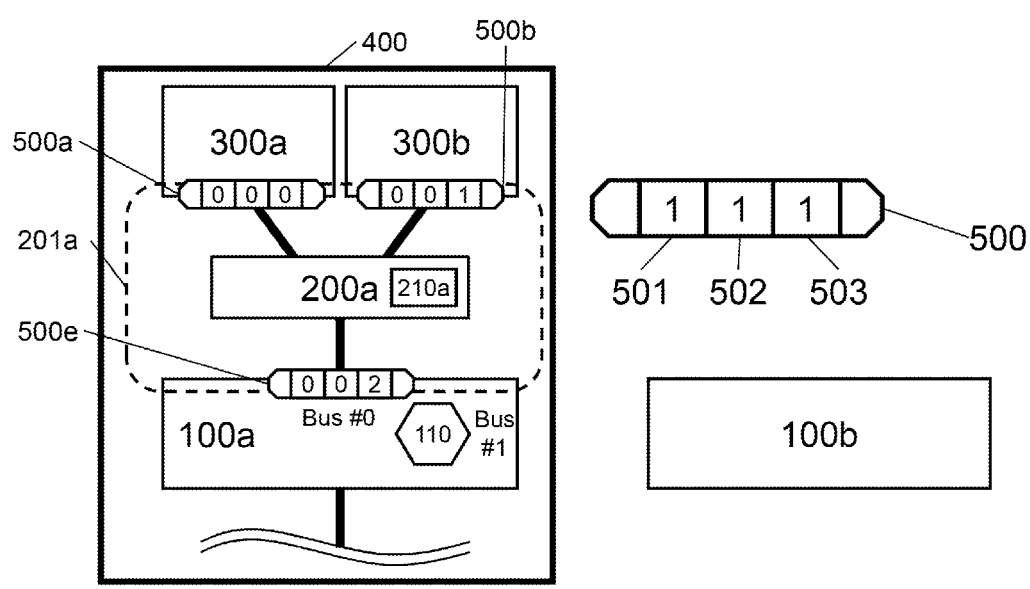
FIG. 5 shows a system in which normal port IDs are allocated to each of servers and storages in a closed SAN.

(1.4) The switch (200a) instructs the port ID allocation unit (210a) to allocate a port ID each time the switch (200a) receives an allocation request. The port ID allocation unit (210a) sets a uniquely identifiable number in the SAN (201a) as the unique number (503) to the normal port IDs (500) having the storage number (501) and the path number (502) that are previously set, and, as shown in FIG. 5, allocates the port IDs (500) including the numbers (501) to (503) to an allocation request transmission source apparatus (server (300) or storage (100a)).

With the (1.1) to (1.4) described above, as shown in FIG. 5, the normal port IDs (500a, 500b, 500e) that do not overlap in the SAN (201a) are allocated, and, in the closed SAN (201a), it is possible to perform communication based on a general communication procedure.

<Second Operation Example>Operation in Coupling Additional Storage (100b) to Storage (100a)

After the completion of the first operation, an example of an operation performed until the storage (100a) is ready to perform forwarding after the storage (100b) is coupled will be described with reference to FIG. 6 and FIG. 7.

Figure 6:
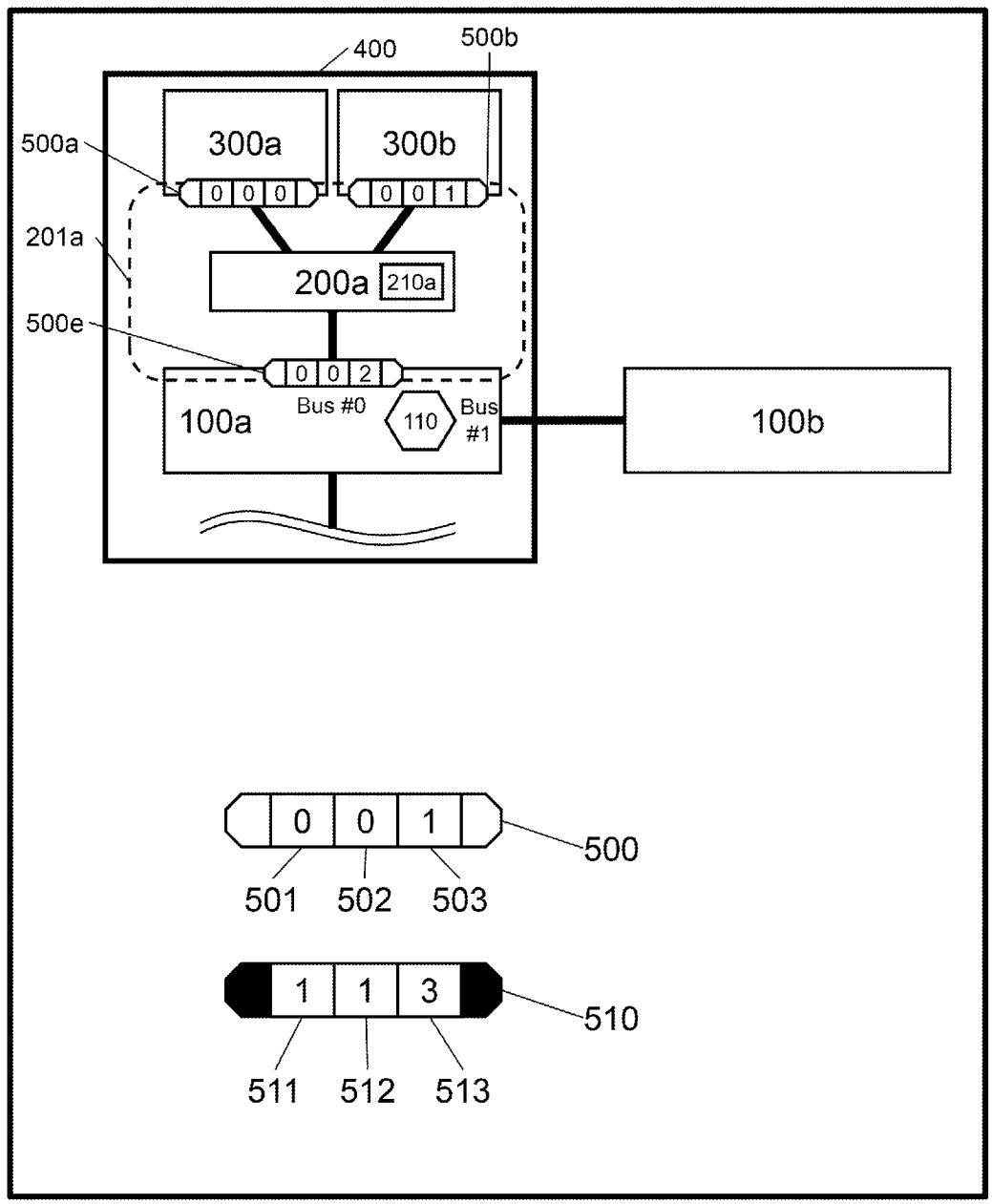
FIG. 6 shows a system obtained before a proxy port ID is allocated to a storage to which an additional storage is coupled.

(2.1) As shown in FIG. 6, the additional storage (100b) is coupled to the storage (100a). Both the storages are then instructed to perform a preparation operation for performing forwarding. This instruction may be output when the storages (100a and 100b) detect electrical and physical coupling and logical coupling or may be output from the above-described management apparatus (401) (or input units which the storages (100a and 100b) have, respectively). The storage (100a) and the additional storage (100b) exchange the storage numbers of the storages and information required for forwarding. As the storage number of the additional storage (100b), when the additional storage (100b) is coupled to the storage (100a), the storage (100a) may allocate a number that does not overlap the storage number of the storage (100a). Alternatively, before the additional storage (100b) is coupled to the storage (100a), the management apparatus (410) may allocate the storage number of the additional storage (100b). The management apparatus (410) manages the storage numbers of the storages in the SAN, and when there is an additional storage, the management apparatus (410) is capable of generating a number (for example, a serial number) that does not overlap the managed storage numbers and allocate the number to the additional storage. In this example, the storage number of the additional storage (100b) is defined as "1".

(2.2) The storage (100a) transmits, to the switch (200a), the special allocation request that designates the transfer destination storage number (511) and the path number (512) of the path (path in the storage (100a)) to which the transfer destination storage (100b) is coupled. In this example, it is assumed that the transfer destination storage number (511) is "1" and the path number (512) is "1".

(2.3) The switch (200a) receives a special allocation request and instructs the port ID allocation unit (210a) to allocate a proxy port ID. The port ID allocation unit (210a) sets, to the proxy port ID (510), a number "1" as the transfer destination storage number (511), sets a number "1" as the path number (512), and sets a unique number in the closed SAN (201a) as the unique number (513), thereby completing the proxy port ID (510). The port ID allocation unit (210a) allocates the generated proxy port ID (510) to the transmission source storage (100a) of the special allocation request. According to the example in FIG. 6, since numbers "0" to "2" have been issued as the unique numbers (513), a unique number "3" is set as the unique number (513) of the proxy port ID (510) (see FIG. 7).

(2.4) After the storage (100a) receives allocation of the proxy port ID (510) from the port ID allocation unit (210a) of the switch (200a), the storage (100a) sets the forwarding unit (110) to determine whether the packet (600) is addressed to the normal port ID (500) or the proxy port ID (510) when the packet (600) is received.

(2.5) The additional storage (100b) performs internal setting in preparation for reception of the packet (600) forwarded from the storage (100a).

Figure 7:
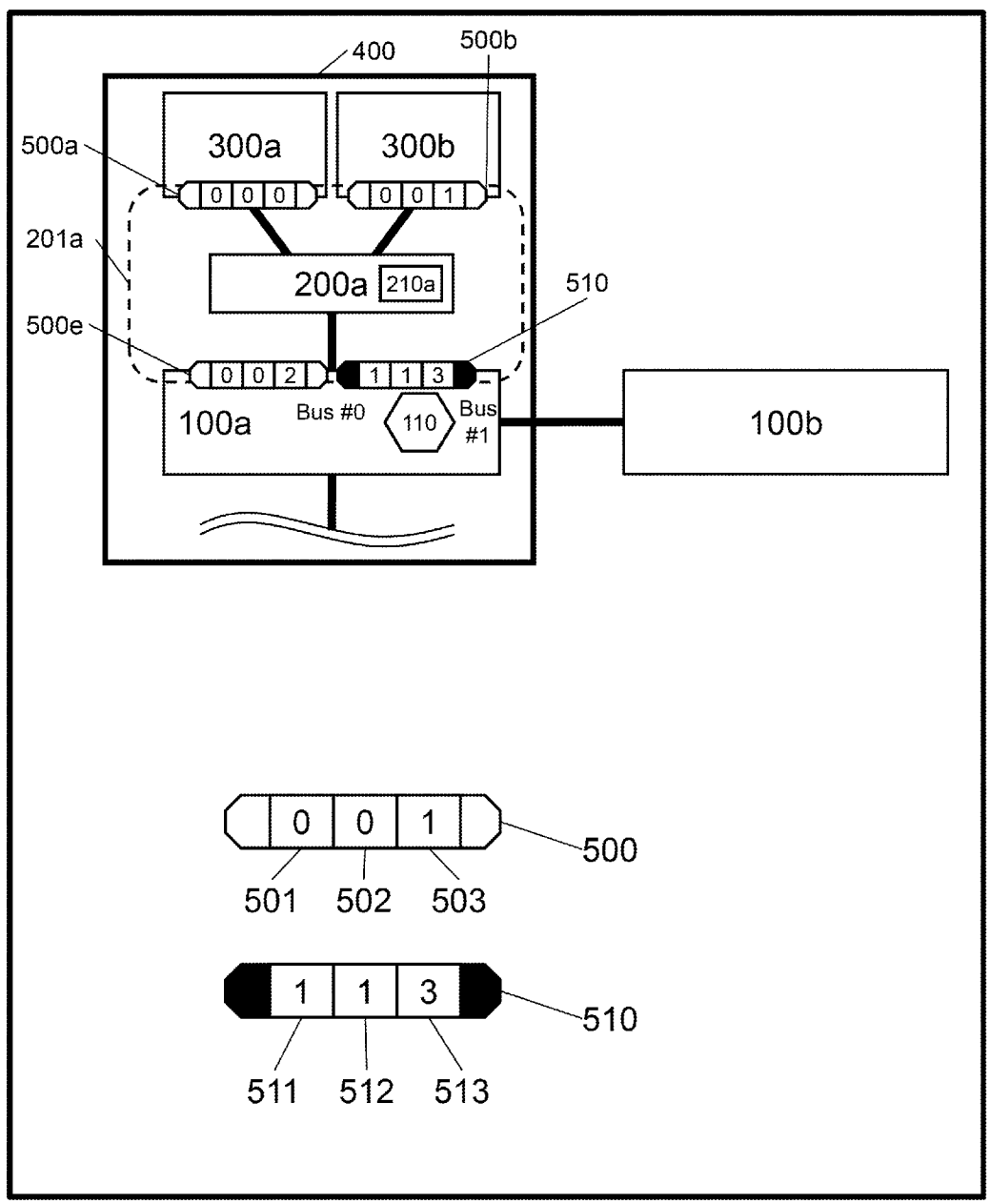
FIG. 7 shows a system obtained after a proxy port ID is allocated to a storage to which an additional storage is coupled.

With the above operation, as shown in FIG. 7, the proxy port ID (510) is allocated to the storage (100a), and a path through which the packet (600) from the servers (300a, 300b) in the closed SAN (201a) reaches the additional storage (100b) is established. The above operation is also performed in the other closed SAN (201b) coupled to the storage (100a). The servers (300a and 300b) recognize the normal port ID (500) allocated to the storage (100a). However, when the second operation example is completed, the servers (300a and 300b) recognize the proxy port ID (510).

<Third Operation Example>In Forwarding State (Outward Way)

Figure 9:
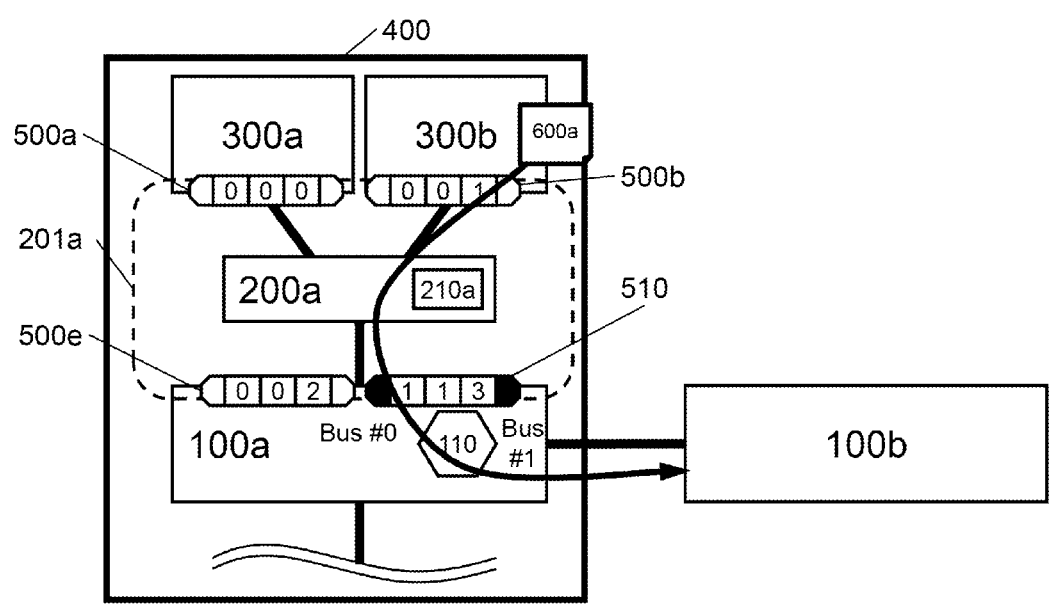
FIG. 9 shows a flow of a packet (command) from a server to an additional storage.

Upon completion of the second operation example, the server (300) coupled to the closed SAN (201) is in a state of being able to access the additional storage (100b) by designating the proxy port ID (510) as a destination. In this state, an operation example performed when the server (300) sends a command to the additional storage (100b) will be described with reference to FIG. 9.

(3.1) The server (300b), in order to transmit a command to the additional storage (100b), sets the proxy port ID (510) to the destination region (601) of a packet (600a), sets a normal port ID (500b) of the server (300b) to the sending source region (602) of the packet (600a), and sets a command to the data region (603) of the packet (600a). The server (300b) sends the generated packet (600a) to the switch (200a).

(3.2) The switch (200a) receives the packet (600a), specifies the transfer destination storage (100a) of the packet (600a) by a normal routing operation based on a port ID in the destination region (601), and transfers the packet (600a) to the storage (100a).

(3.3) The storage (100a) receives the packet (600a) and passes the received packet (600a) to the forwarding unit (110). The forwarding unit (110) specifies that the port ID in the destination region (601) of the packet (600a) is the proxy port ID (510). For example, the forwarding unit (110), when the storage number (501 or 511) in the destination port ID matches with the storage number of its own storage (100a), determines the destination port ID as the normal port ID (500). When these storage numbers do not match with each other, the destination port ID is determined as the proxy port ID (510).

(3.4) The forwarding unit (110) acquires the path number (512) from the proxy port ID (510) and transfers the packet (600a) to a path represented by the acquired path number. In this manner, the packet (600a) is transferred to the additional storage (100b).

(3.5) The additional storage (100b) receives the packet (600a) from the storage (100a). The additional storage (100b) extracts the command included in the data region (603) in the received packet (600a) to perform a process according to the command.

With the above processes, from the server (300b), the packet (600a) in which the command is stored reaches the additional storage (100b).

<Fourth Operation Example>In Forwarding State (Homeward Way)

Figure 10:
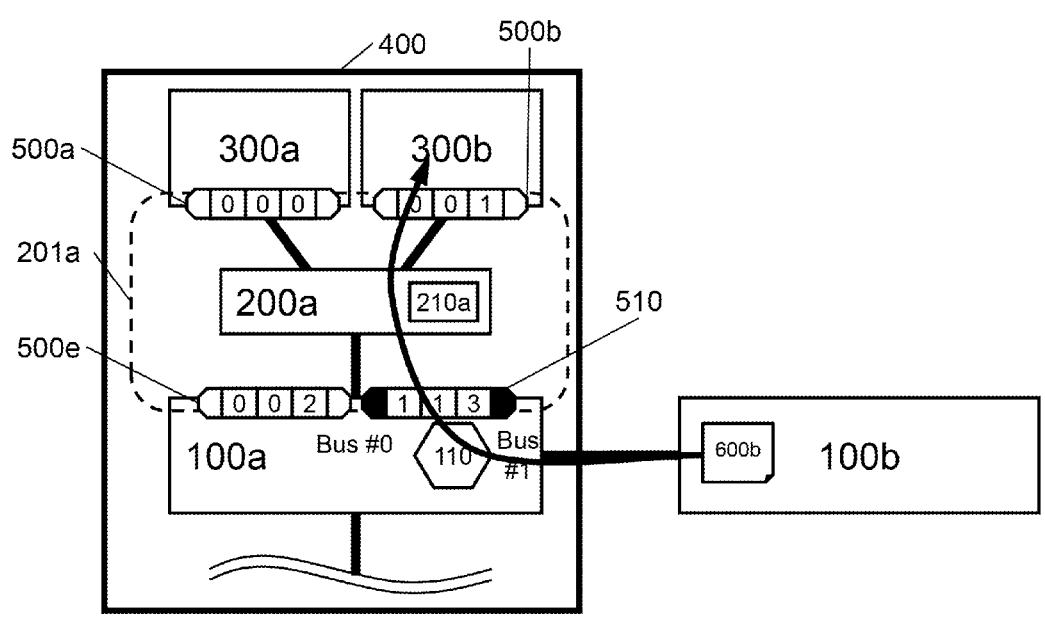
FIG. 10 shows a flow of a packet (response) from an additional storage to a server.

After the third operation example, in order to return a processing result of the command to the server (300b), the additional storage (100b) transmits the packet (600) including the result. An operation example of returning the result for the command will be described with reference to FIG. 10. In this operation example, an operation of sending the packet (600b) including the result from the additional storage (100b) to the server (300b) will be described.

(4.1) The additional storage (100b) sets the processing result of the command to the data region (603) of a packet (600b), sets the destination port ID in the packet (600a) in which the command has been stored to the sending source region (602) of the packet (600b), and sets a sending source port ID in the packet (600a) to the destination region (601) of the packet (600). In this manner, a new packet (600b) is generated. The additional storage (100b) transmits the packet (600b) to the storage (100a).

(4.2) The storage (100a) receives the packet (600b) and passes the received packet (600b) to the forwarding unit (110). The forwarding unit (110) identifies the destination of the packet (600b) as the normal port ID (500), and compares the normal port ID (500) with normal port IDs (500e, 500f) allocated to the storage (100a). In this case, since these port IDs does not match with each other, the forwarding unit (110) acquires the path number (502) from the normal port ID (500) serving as a destination, and transfers the packet (600b) to a path represented by the acquired path number. In this manner, the packet (600b) is transferred to the switch (200a).

(4.3) The switch (200a) receives the packet (600b), and transfers the packet (600b) to the server (300b) by a normal routing operation.

(4.4) The server (300b) receives the packet (600b) to execute a process suitable for an execution result of a transmitted command.

<Fifth Operation Example>In Normal State

Figure 11:
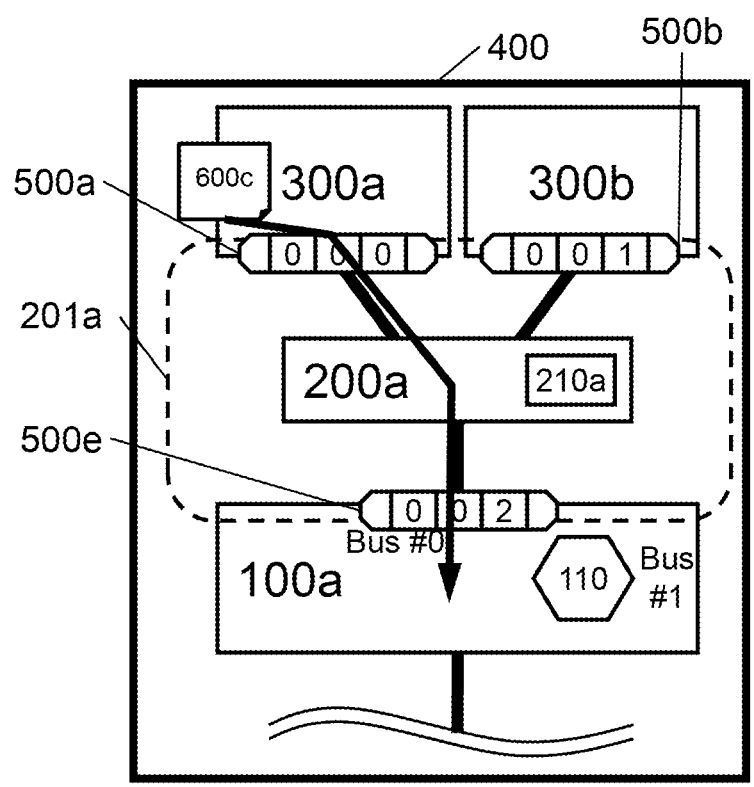
FIG. 11 shows a flow of a packet (command) from a server to a storage.

A communication procedure in an outward state of the storage (100a) and the server (300a) coupled to the storage (100a) through the SAN (201a) will be described with reference to FIG. 11.

(5.1) The server (300a) transmits, to the switch (200a), a packet (600c) that uses the normal port ID (500e) held by the storage (100a) as a destination port ID.

(5.2) The switch (200*a*) transfers the packet (600*c*) to the storage (100*a*) to which the destination port ID is allocated.

(5.3) The storage (100*a*) sends the received packet (600*c*) to the forwarding unit (110). The forwarding unit (110) identifies that the destination port ID of the packet (600*c*) as the normal port ID (500), and compares the normal port ID (500) with the port ID (500*e*) allocated to the storage (100*a*). Since both the port IDs (500) match with each other, the forwarding unit (110) determines that the packet (600*c*) is addressed to its own storage (100*a*) to transfer a command to the storage (100*a*). More specifically, for example, the forwarding unit (110) acquires the path number (502) from the destination port ID and transfers the command in the packet (600*c*) to a path represented by the acquired path number.

(5.4) The storage (100*a*) processes the command.

Figure 12:
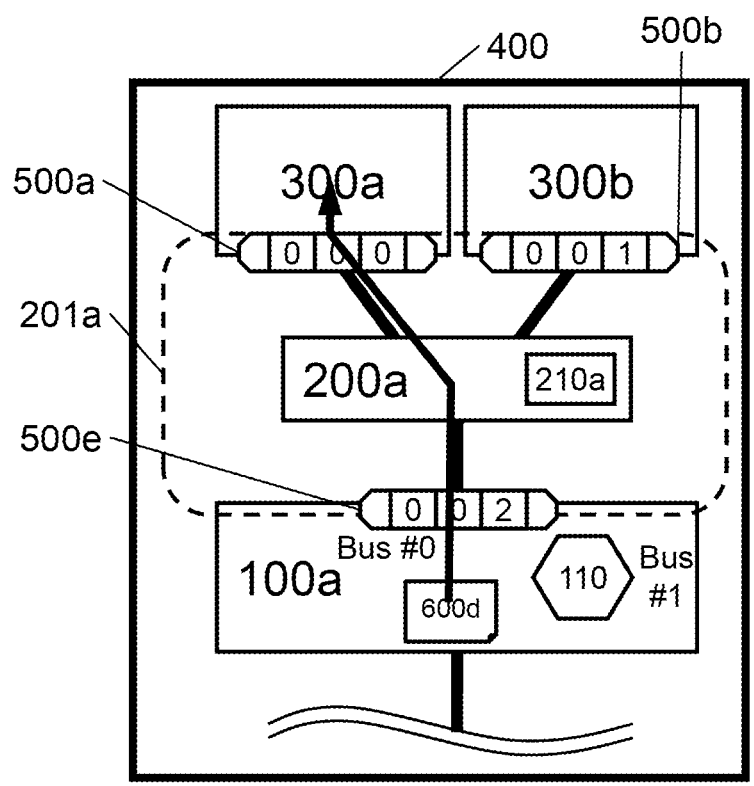
FIG. 12 shows a flow of a packet (response) from a storage to a server.

Next, a communication procedure in a homeward state of a packet including a result for the command will be described with reference to FIG. 12.

(5.5) The storage (100*a*) generates a packet (600*d*) including the result for the command. The packet (600*d*) includes the normal port ID (500*a*) of the server (300*a*) as the destination port ID and includes the normal port ID (500*e*) of the storage (100*a*) as a sending source port ID. The storage (100*a*) transmits the generated packet (600*d*) to a path represented by the path number (502) in the destination port ID. In this manner, the packet (600*d*) is transmitted to the switch (200*a*).

(5.6) The switch (200*a*) receives the packet (600*d*) and, based on the destination port ID (500*a*) of the packet (600*d*), transfers the packet (600*d*) to the server (300*a*).

(5.7) The server (300*a*) receives the packet (600*d*) to execute a process suitable for a command execution result in the packet (600*d*).

Figure 13:
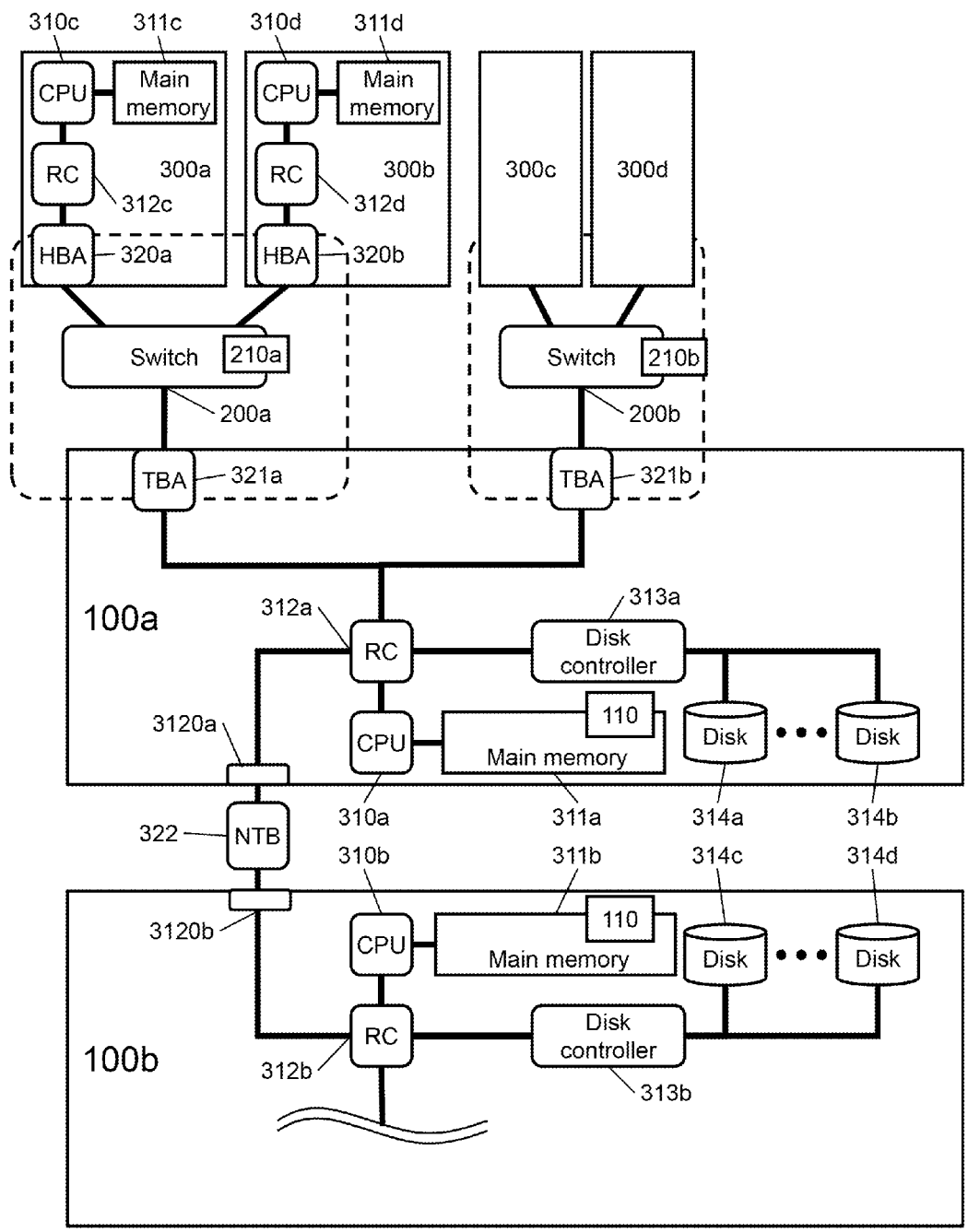
FIG. 13 shows a detailed configuration example of a system according to a first embodiment.

FIG. 13 shows a detailed configuration example of a system according to the first embodiment.

A device that couples the storages (100) to each other is a bus direct coupling device. As an example of the bus direction coupling device, an NTB (NON-Transparent Bridge) (322) is employed. More specifically, as a coupling medium between the storage (100*a*) and the additional storage (100*b*), a PCI express bus and the NTB (322) are used. The storage (100) has an interface (for example, a port) (3120) to which an external apparatus is capable of coupling, and is capable of coupling interfaces (3120*a* and 3120*b*) of the storages (100*a* and 100*b*) to each other through the NTB (322). When RCs (Root Complexes) (312*a* and 312*b*) of the PCI express are coupled to each other through the NTB (322), it is possible to form a one-to-one communication path from both the CPUs (Central Processing Units) (310*a* and 310*b*) to the other side. One reason why the bus direct coupling device such as the NTB (322) is employed is as follows. More specifically, when the additional storage (100*b*) is coupled to the storage (100*a*) through a network, not through the bus direct coupling device, the storage (100*a*) must perform network management such as acquisition of a network address such as an IP address, i.e., must perform the role of a network router. Forwarding is desired to be achieved by only using the path number (512). Thus, by using the bus direct coupling device, it is possible to transfer a packet by only using the path number (512) (for example, a bus number). Although the RC (312) is also a kind of bus direct coupling device, when the RC (312*a*) and the RC (312*b*) are directly coupled to each other, both the RCs become initiators. Thus, the NTB (322) to construct an initiator/target relationship is interposed.

The CPU (310*a*) of the storage (100*a*) is capable of identifying devices such as TBAs (Target Bus Adaptors) (321*a* and 321*b*), the NTB (322), and a disk controller (313*a*) coupled to the RC (312*a*) by device numbers uniquely allocated to the devices in the storage (100*a*). When the RC (312*a*) is concerned, it is possible to use a device number as a path number. The path number may be, for example, a slot ID of the PCI express bus of the storage (100) (PCI express is a registered trademark). The forwarding unit (110), in this example, is achieved by executing a program in the CPU (310) of the storage (100). Thus, it is assumed that a program serving as the substance of the forwarding unit (110) is on a main memory (311) of the storage (100). The disk controller (313*a*) is an example of a storage controller, and controls input/output of data to a disk (314) serving as an example of a nonvolatile storage device. The disk (314) is, for example, an HDD (Hard Disk Drive) or an SSD (Solid State Drive). The TBA (321) is an example of an interface device which the storage has.

Incidentally, the server (300) also has the RC (312). The CPU (310) and an HBA (Host Bus adaptor) (320) are coupled to the RC (312). The CPU (310) uses the main memory (311). The HBA (320) is an example of an interface device which the server has. The switch (200) is, for example, an FC (Fibre Channel) switch. Although not shown, the storage (100) and each of the servers (300) have interfaces such as NICs (Network Interface Card) and are capable of coupling to the management apparatus (410) through the interfaces.

Figure 17:
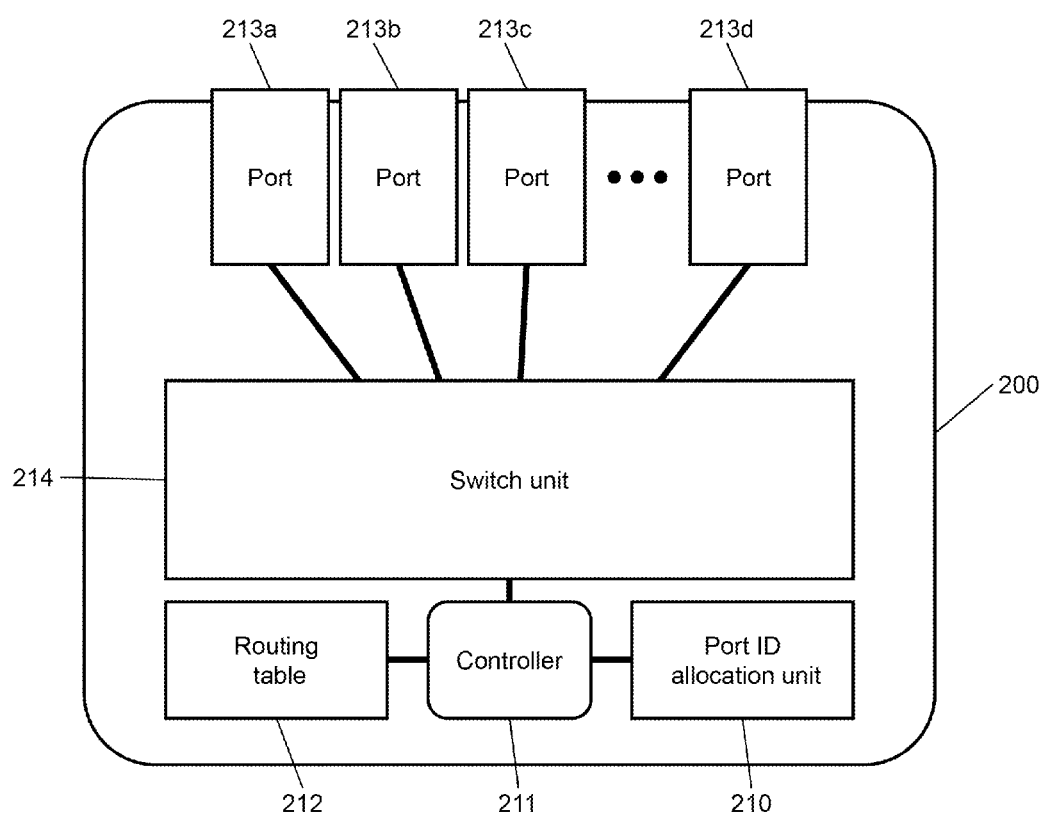
FIG. 17 shows a detailed configuration example of a switch.

FIG. 17 shows a detailed configuration example of the switch (200).

The switch (200) has a plurality of ports (physical ports) (213), a switching unit (214) for performing routing between the ports (213), a storage area in which the routing table (212) serving as a transfer management table is stored, and a controller (211) that controls an operation of the switching unit (214) based on the routing table (212), and the port ID allocation unit (210) is further incorporated in the switch (200). The switching unit (214), under the control of the controller (211), specifies the transfer destination port (213) based on a destination port ID included in the packet (600) entering from the port (213) and the routing table (212) to transfer the packet (600) to the specified port (213). The port ID allocation unit (210) may be mounted as a physical mechanism (hardware) or achieved by executing a program with the controller (211).

Operations of the storage (100), the switch (200), and the server (300) will be described with reference to FIG. 14 to FIG. 19.

<Operation Example of Storage>

Figure 14:
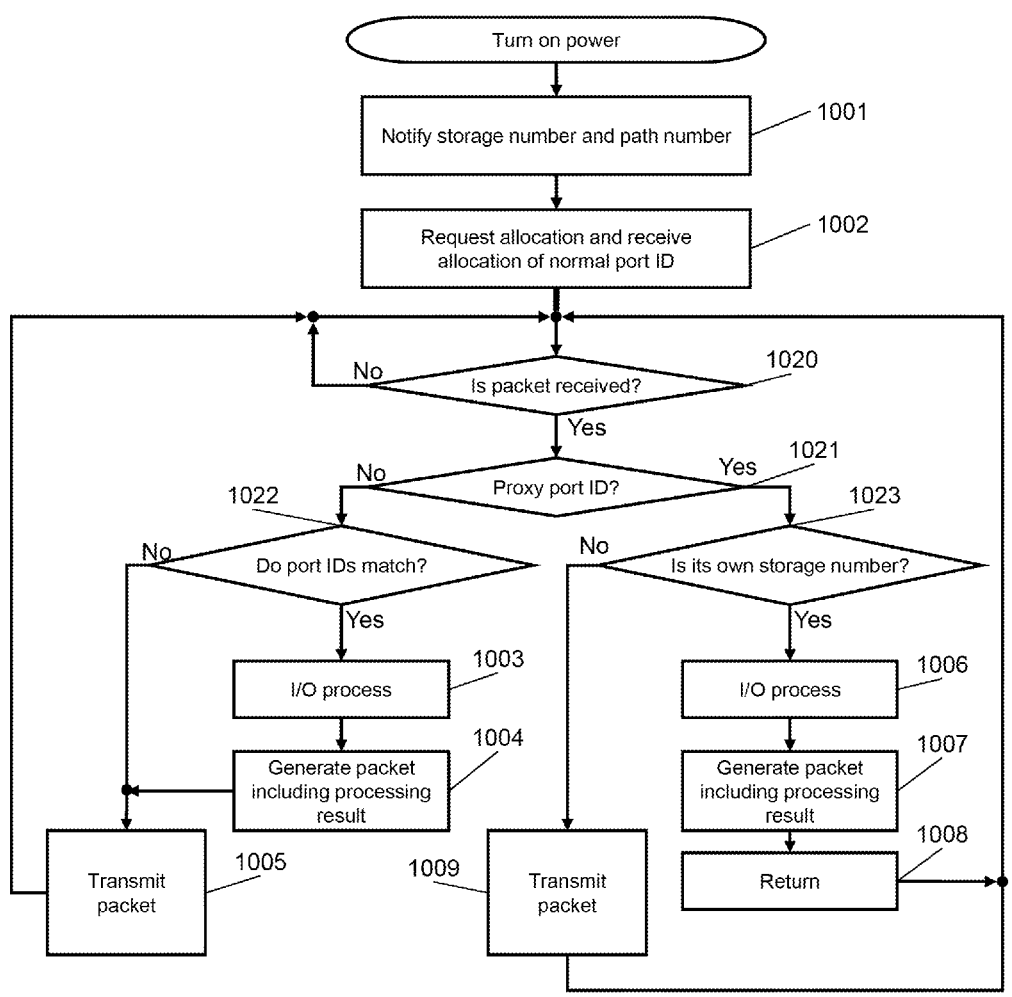

FIG. 14 shows an operation flow of the storage (100) after power is turned on. The power supply of the storage (100) is turned on to start this flow. In the following description, it is assumed that the CPU (310) executes one or more programs to achieve a control unit (not shown) and the forwarding unit (110).

The control unit notifies, of the storage number (501) of the storage (100) and the path number (502) of a path coupled to the switch (200*a*), the switch (200) coupled to the end of the path (step 1001). This notifying method is performed as a part of communication with the switch (200). The control unit transmits an allocation request of the port ID (500) to the switch (200), and receives allocation of the normal port ID (500) (step 1002). The steps 1001 and 1002 may be performed in the initialization process.

The control unit determines whether the packet (600) is received (step 1020). When the determination result is false (step 1020: No), step 1020 is performed again.

When the packet (600) is received (step 1020: Yes), the control unit calls the forwarding unit (110), and the forwarding unit (110) determines whether the destination port ID of the packet (600) is the proxy port ID (510) (step 1021).

When the determination result in step 1021 is false (step 1021: No), the forwarding unit (110) determines whether the destination port ID in the packet (600) matches with the port ID (500) allocated in step 1002 (step 1022).

When the determination result in step 1022 is true (step 1022: Yes), the control unit acquires a command from the packet (600) and executes a process (for example, an I/O (Input/Output) process to the disk (314)) according to the command (step 1003). The control unit generates the packet (600) that includes, as a destination port ID, an issuing source port ID in the packet (600) that included the processed command, and that includes the processing result in step 1003 (step 1004). The control unit acquires the path number (502) from the destination port ID in the packet (600), and sends the packet (600) to a path (device) represented by the path number (step 1005). In this manner, the packet (600) is sent to an issuing source apparatus of the packet (600) that included the command.

When the determination result in step 1022 is false (step 1022: No), the control unit acquires the path number (502) from the destination port ID in the packet (600), and sends the packet (600) to a path (device) represented by the path number (step 1005).

When the determination result in step 1021 is true (step 1021: Yes), the forwarding unit (110) determines whether the transfer destination storage number (511) of the proxy port ID (510) in the packet (600) matches with the storage number of its own storage (200) (step 1023).

When the determination result in step 1023 is true (step 1023: Yes), the determination result means that the destination of the packet is its own storage. In this case, the control unit acquires a command from the packet (600) and performs a process according to the command (step 1006). The control unit generates the packet (600) that includes, as a destination port ID, an issuing source port ID in the packet (600) that included the processed command, and that includes the processing result in step 1006 (step 1007). The control unit sends the packet (600) back to the path (device) through which the packet (600) including the command has been transferred (step 1008). More specifically, the packet (600) is sent back to the storage (100a) that transferred the packet (600) to the additional storage (100b) when the packet(600) is a forwarded packet.

When the determination result in step 1023 is false (step 1023: No), the determination result means that the destination of the packet is the additional storage (100b). In this case, the forwarding unit (110) acquires the path number (512) from the proxy port ID (510) in the packet (600), and sends the packet (600) to a path (device) represented by the path number. In this manner, the packet (600) is transferred to the additional storage.

Figure 15:
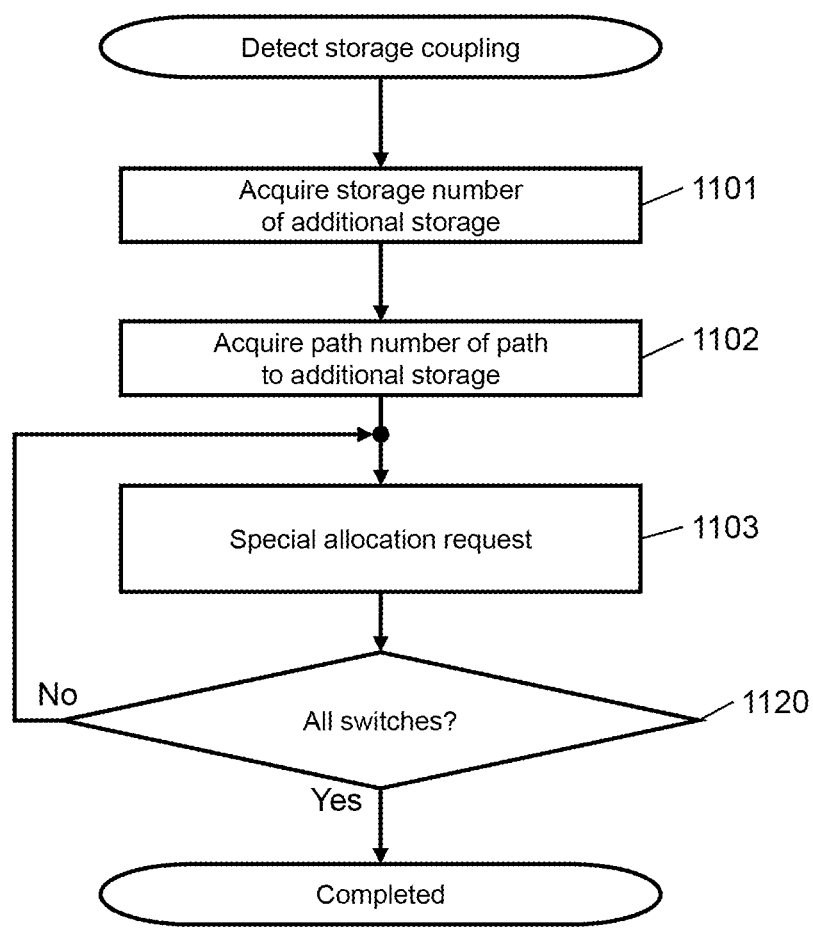
FIG. 15 shows an operation flow of a storage obtained when an additional storage is coupled to a storage.

FIG. 15 shows an operation flow of the storage (100a) obtained when the additional storage (100b) is coupled to the storage (100a). This flow is started when the storage (100a) detects that the additional storage (100b) is coupled (when a signal of some sort is imparted by the additional storage (100b) or another external apparatus).

The CPU (310a) acquires the storage number of the additional storage (100b) (step 1101) and acquires a path number to identify a path (device) to the additional storage (100b) (step 1102). The CPU (310a) transmits a special allocation request that designates the storage number acquired in step 1101 and the path number acquired in step 1102 as the transfer destination storage number (511) and the transfer destination path number (512), respectively, to the switch (200) that has not become a destination of the request (step 1103). In response to the request, the CPU (310a) receives allocation of the proxy port ID (510) of the additional storage (100b) (step 1103).

The CPU (310a) ends this flow when step 1103 is performed with respect to all the switches (200) coupled to the storage (100a) (step 1120: Yes). When there is a switch (200) to which step 1103 has not been performed, step (1103) is performed on the switch (200).

Figure 16:
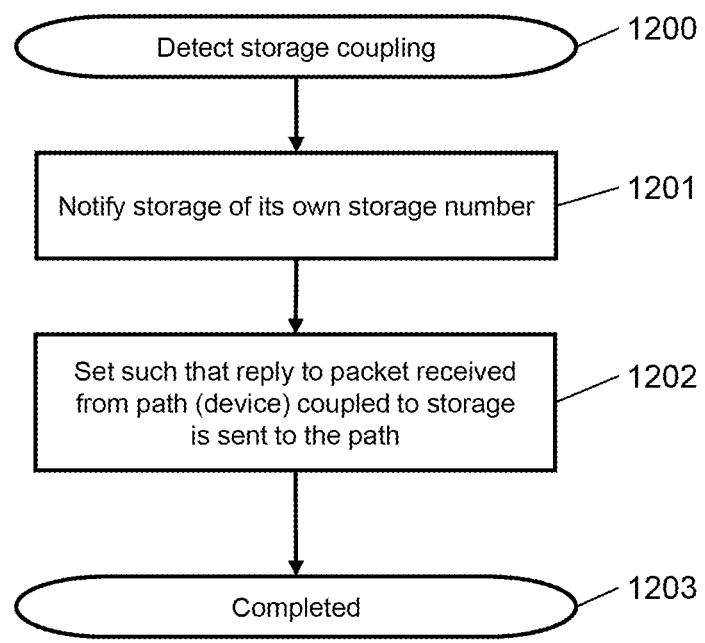
FIG. 16 shows an operation flow of an additional storage obtained when an additional storage is coupled to a storage.

FIG. 16 shows an operation flow of the additional storage (100b) obtained when the additional storage (100b) is coupled to the storage (100a). This flow is started when the additional storage (100b) detects that the additional storage (100b) is coupled to the storage (100a) (when a signal of some sort is imparted by the storage (100a) or another external apparatus).

The CPU (310b) notifies the storage (100a) of its own storage number (step 1201), and performs setting such that a reply to a packet received from a path (device) coupled to the storage (100a) is sent to the path (device) (step 1202).

<Operation Example of Switch>

Figure 18:
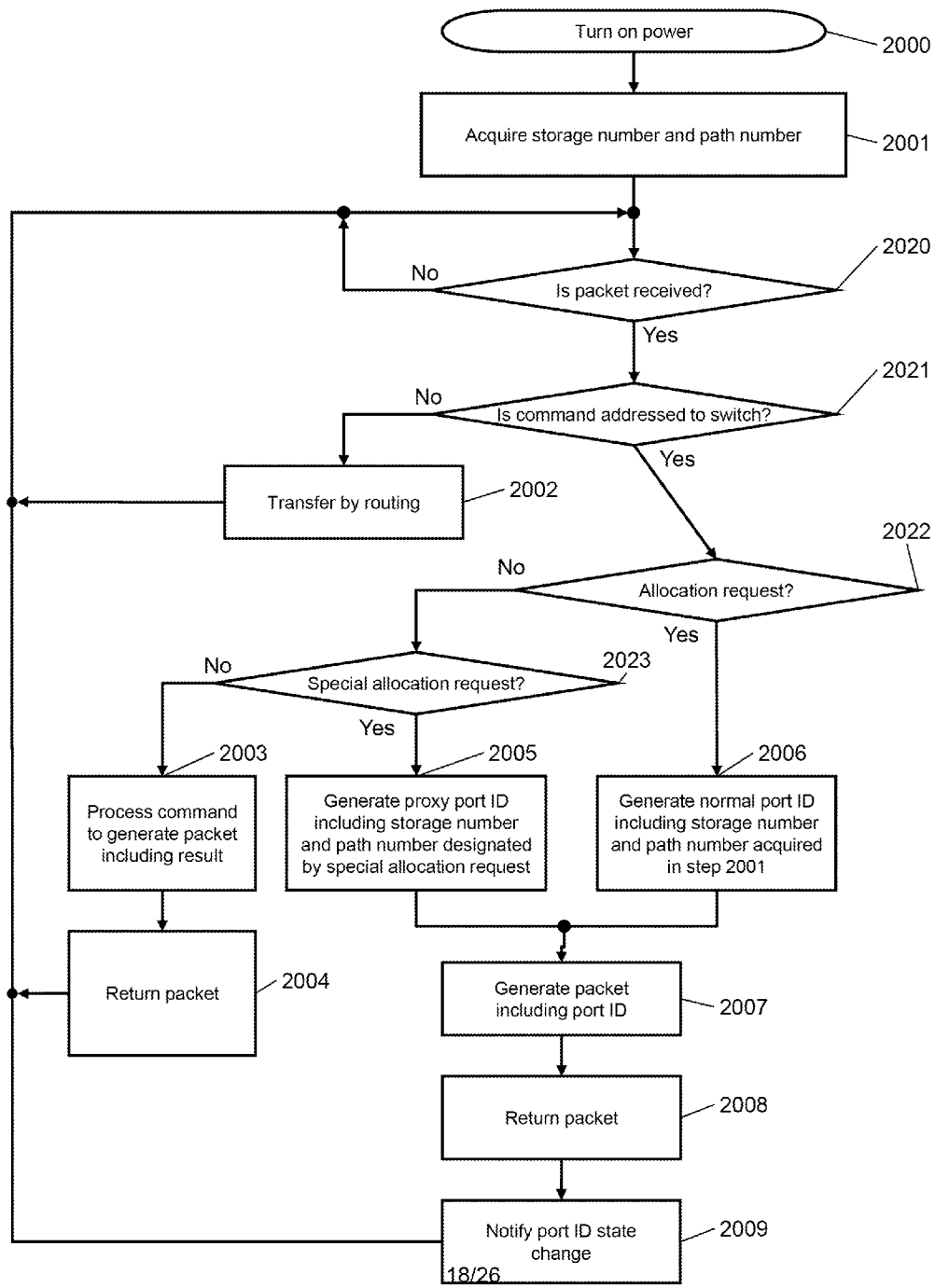

FIG. 18 shows an operation flow of the switch (200) after power is turned on. The power supply of the switch (200) is turned on to start this flow.

The controller (211) of the switch (200) acquires, by communication with the storage (100a), the storage number (501) of the storage (100a) and the path number (502) that identifies a path (device) linked to the switch (200) in the storage (100a) (step 2001). The step 2001 may be performed in the initialization process. It is noted that the controller (211) has a memory to store the received storage number (501) and the path number (502) in the memory. Thereafter, when an allocation request of a normal port ID is received, the controller (211) is capable of transmitting a port ID including the storage number and the path number in the memory and a generated unique number to a transmission source of the allocation request.

The controller (211) determines whether the packet (600) is received (step 2020). When the determination result is false (step 2020: No), step 2020 is performed again.

When the determination result in step 2020 is true (step 2020: Yes), the controller (211) determines whether the destination port ID of the packet (600) is a port ID addressed to the switch (200) (step 2021).

When the determination result in step 2021 is false (step 2021: No), the controller (211) refers to the routing table (212), specifies the transfer destination port (213), and transfers the received packet (600) to the transfer destination port (213) (step 2002).

When the determination result in step 2021 is true (step 2021: Yes), the controller (211) determines whether a command included in the received packet (600) is an allocation request of a normal port ID (step 2022).

When the determination result in step 2022 is true (step 2022: Yes), the controller (211) generates the normal port ID (500) including the storage number (501) and the path number (502) acquired in step 2001 (step 2006). The controller (211) generates the packet (600) including an allocation reply of the normal port ID (500) (step 2007), and sends the packet (600) to the ports (213) coupled to an allocation request source(step 2008). The controller (211) transmits a packet including a notification indicating that a port ID state has been changed to an apparatus coupled to the switch (200) (step 2009).

When the determination result in step 2022 is false (step 2022: No), the controller (211) determines whether a command included in the received packet (600) is a special allocation request (step 2023).

When the determination result in step 2023 is true (step 2023: Yes), the controller (211) acquires the transfer destination storage number (511) and the path number (512) included in the special allocation request to generate the proxy port ID (510) including the two numbers(step 2005). The controller (211) generates the packet (600) including an allocation reply of the proxy port ID (510) (step 2007), and, thereafter, performs steps 2008 and 2009.

When the determination result in step 2023 is false (step 2023: No), the controller (211) processes the command (command to the switch 200) in the packet (600), prepares a reply (step 2003), and sends the packet (600) including the reply to the ports (213) to which a transmission source of the received packet (600) is coupled (step 2004).

<Operation Example of Server>

Figure 19:
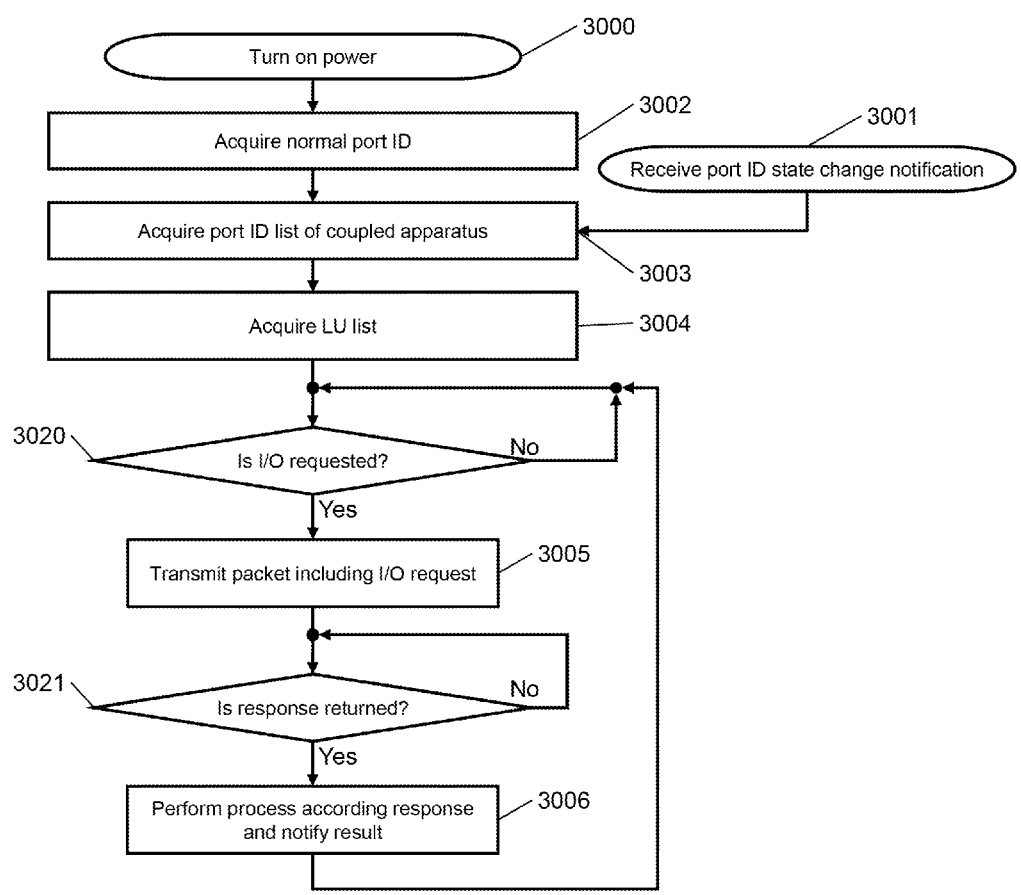

FIG. 19 shows an operation flow of the server (300) after power is turned on. The power supply of the server (300) is turned on to start this flow.

A CPU (310c) transmits a packet including an allocation request of the normal port ID (500) to the switch (200), and, in response to this, acquires the normal port ID (500) (step 3002).

When the CPU (310c) receives a packet including a port change notification from the switch (200) (step 3001), the CPU (310c) transmits, to the switch (200), a packet including a request for a port ID list of an apparatus coupled to the switch (200) and, in response to this, acquires the port ID list of the apparatus coupled to the switch (200) (step 3003).

The CPU (310c) acquires a list of LUNs of accessible LUs (Logical Units) (step 3004). For example, the CPU (310c) generates and transmits a packet including a normal port ID of a storage as a destination port ID and an LU list request, or executes an LU search process (for example, broadcasting transmission of a packet including an Inquiry command).

The CPU (310c) determines whether there is an I/O request by an application executed by the CPU (310c) (step 3020). When the determination result is false (step 3020: No), step 3020 is performed again.

When the determination result in step 3020 is true (step 3020: Yes), the CPU (310c) transmits a packet including a port ID of a storage as a destination port ID and an I/O request (step 3005).

The CPU (310c) determines whether a packet serving as a response of the packet including the I/O request is returned (step 3021). When this determination result is false (step 3021: No), step 3021 is performed again.

When the determination result in step 3021 is true (step 3021: Yes), the CPU (310c) performs a process according to a result (response to the I/O request) in the returned packet, and returns the processing result to an application of an I/O request transmission source (step 3006).

Second Embodiment

In order to make management of a plurality of SANs easy, a management apparatus and a management path are used. In this embodiment, a method of conveying a storage number and a path number to a switch by a system including the management apparatus and the management path will be described with reference to FIG. 20.

Figure 20:
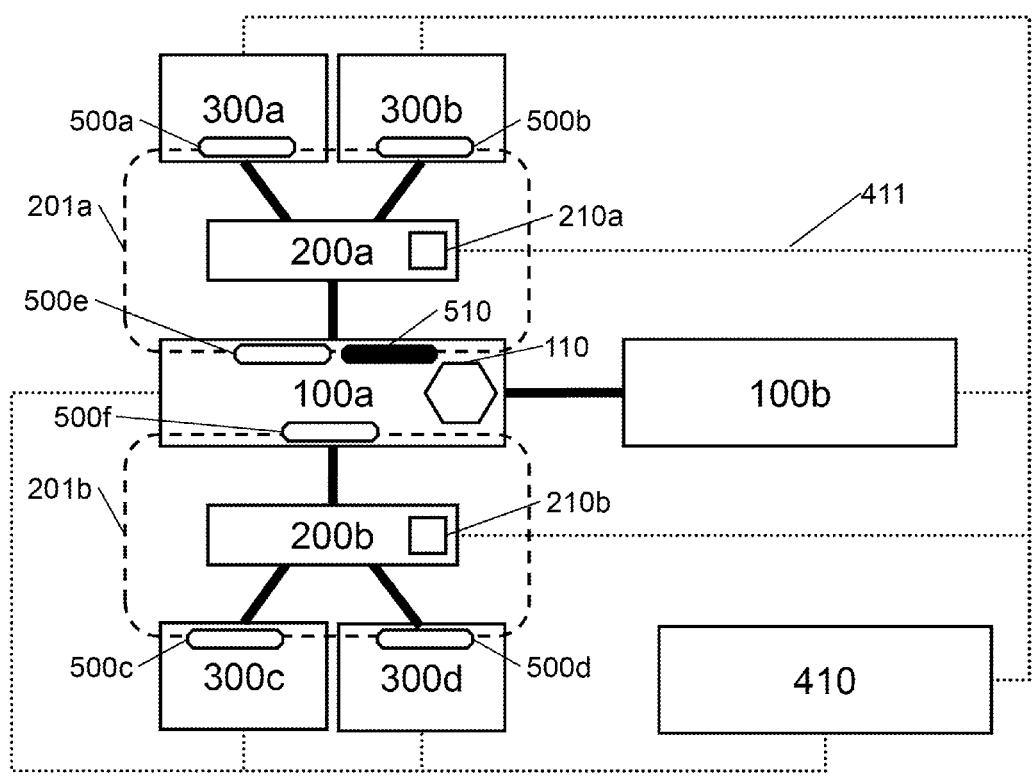
FIG. 20 shows a configuration of a computer system according to a second embodiment.

FIG. 20 shows a configuration of a computer system according to a second embodiment.

The management apparatus (410) may be a computer (for example, a computer equivalent to a server) or an apparatus having a dedicated configuration. The management apparatus (410) is coupled to the server (300), the switch (200), and the storage (100) through a management path (411) being independent of the SAN (201), and manages these apparatuses.

In the first embodiment, the storage number (501) and the path number (502) of the storage (100) are transmitted by communication between the storage (100) and the switch (200). However, in this embodiment, the storage number (501) and the path number (502) of the storage (100) are managed by the management apparatus (410), and these numbers are distributed by the management apparatus (410) through the management path (411).

A different point from the first embodiment will be mainly described below.

<Operation Example of Storage>

A different point from the operation flow in FIG. 14 is described. In step 1001, the switch (200) receives the storage number (501) of the storage (100) from the management apparatus (410) through the management path (411). The rest of the operation flow is the same as in the first embodiment.

A different point from the operation flow in FIG. 15 is described. The CPU (310a) receives a notification indicating that the additional storage (100b) is coupled to the storage (100a) from the management apparatus (410). In step 1101, the CPU (310a) receives the storage number of the additional storage from the management apparatus (410). The rest of the operation flow is the same as in the first embodiment.

A different point from the operation flow in FIG. 16 is described. The CPU (310b) receives a notification indicating that the additional storage (100b) is coupled to the storage (100a) from the management apparatus (410) through the management path (411). There is no step 1201. The rest of the operation flow is the same as in the first embodiment.

<Operation Example of Switch>

A different point from the operation flow in FIG. 18 is described. In step 2001, the controller (211) receives the storage number (501) of the storage (100a) and the path number (502) from the management apparatus (410) through the management path (411). The rest of the operation flow is the same as in the first embodiment.

The management apparatus (410) displays information (for example, a screen) showing a coupling state of the SAN (201) to an administrator. The "display" mentioned here may mean that information is displayed on a display device included in the management apparatus (410), or may means that information for display is transmitted to a remote display computer coupled to the management apparatus (410). A change of screens displayed by the management apparatus (410) will be described with reference to FIG. 21 to FIG. 24.

Figure 21:
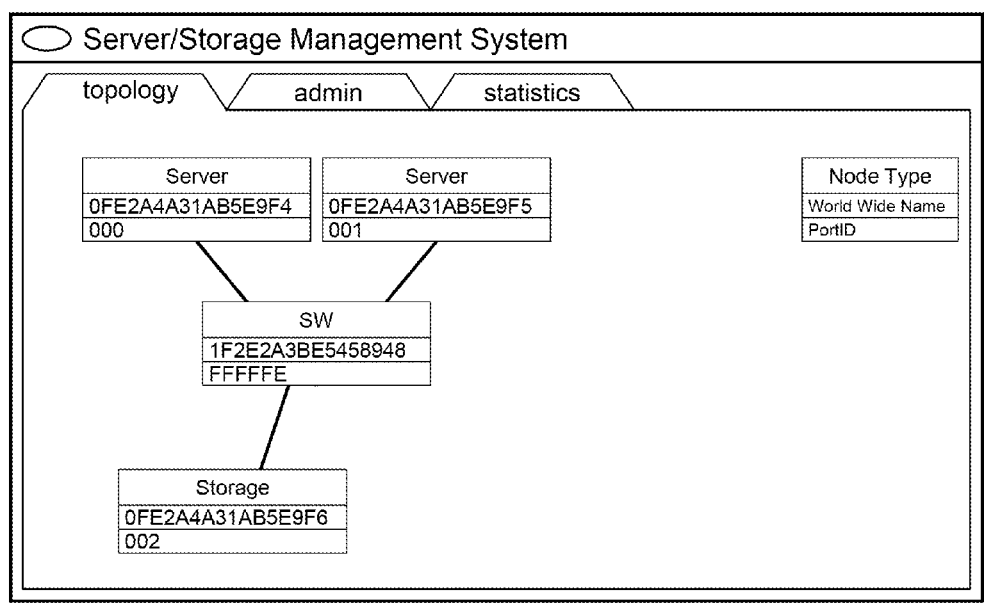
FIG. 21 shows a screen showing a state obtained before an additional storage is coupled to a storage.
Figure 22:
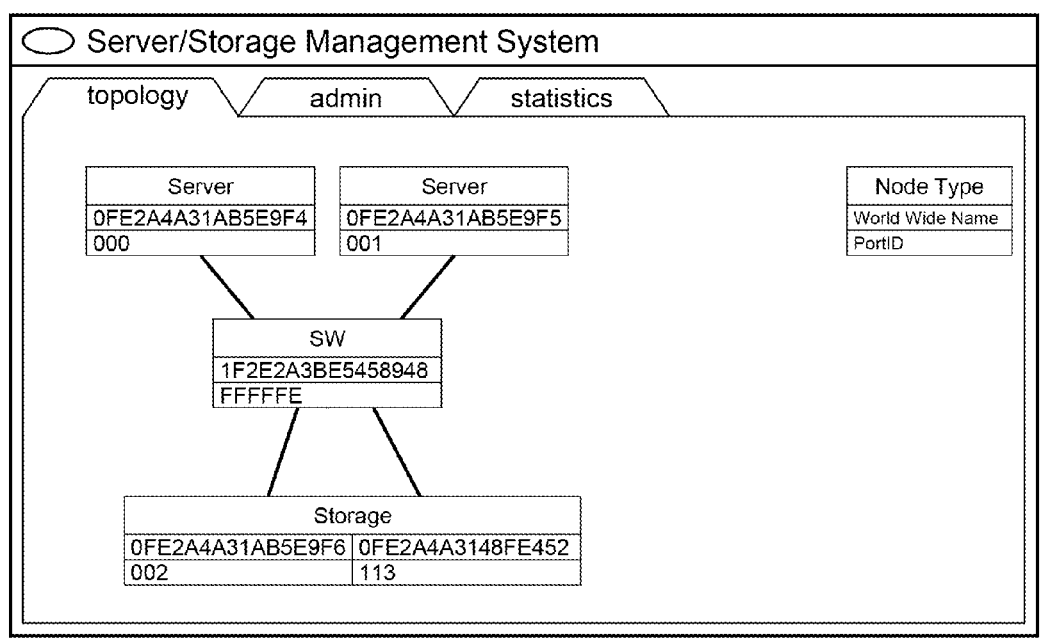
FIG. 22 shows a first example of a screen showing a state obtained after an additional storage is coupled to a storage.

FIG. 21 shows a screen showing a state (state in FIG. 5) obtained before the additional storage (100b) is coupled to the storage (100a), and FIG. 22 shows a screen showing a state (state in FIG. 7) obtained after the additional storage (100b) is coupled to the storage (100a).

As is apparent from comparison between FIG. 21 and FIG. 22, when the coupling of the additional storage (100b) is completed, the screen shows as if a new coupling path corresponding to the proxy port ID (510) is added to the storage (100a).

Figure 23:
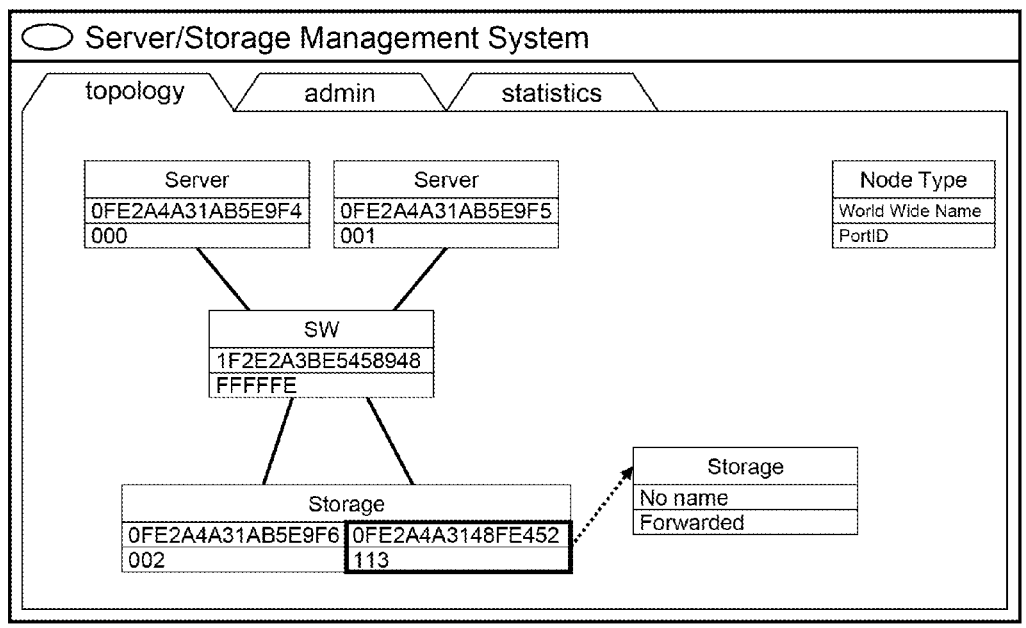
FIG. 23 shows a second example of a screen showing a state obtained after an additional storage is coupled to a storage.
Figure 24:
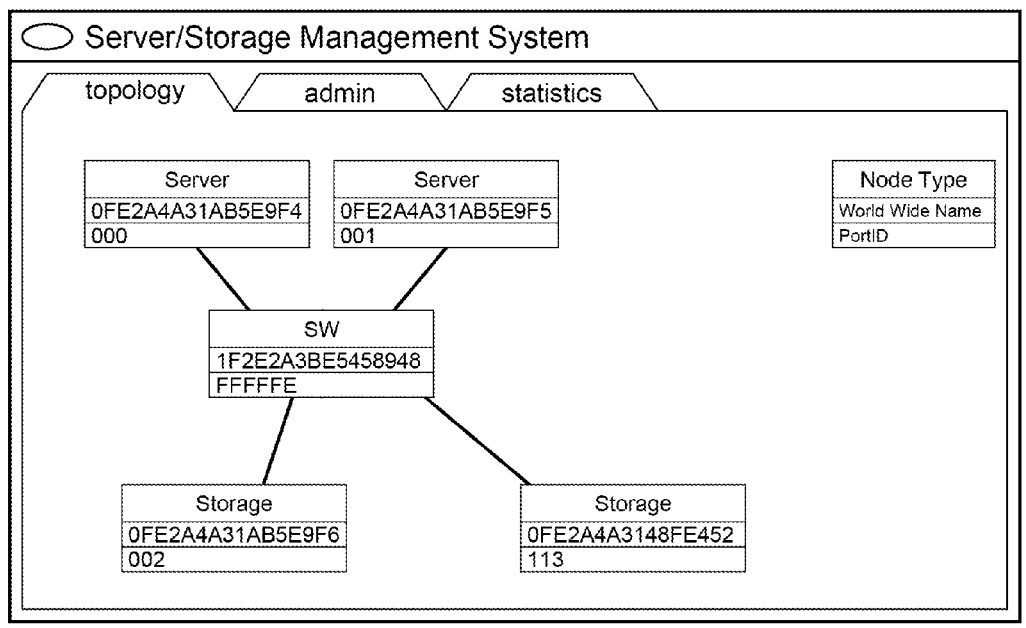
FIG. 24 shows a third example of a screen showing a state obtained after an additional storage is coupled to a storage.

Since the port of the additional storage (100b) is not present in the SAN (201), the management apparatus (410) does not display the additional storage (100b) on the screen. However, as shown in FIG. 23, an object representing the additional storage (100b) that does not have a port in the SAN may be displayed. Alternatively, the management apparatus (410), as shown in FIG. 24, may display the proxy port ID as if the proxy port ID serves as a path to the additional storage.

Third Embodiment

A third embodiment is an example in which the closed SAN (201) is logically implemented by one LSI (Large Scale Integration). In the normal SAN (201), the HBA (320) mounted on the server (300) and the TBA (321) mounted on the storage (100) are present in different apparatuses. In this embodiment, an apparatus (330) having the functions of both the HBA (320) and the TBA (321) is present to couple the server (300) and the storage (100) to each other.

Figure 25:
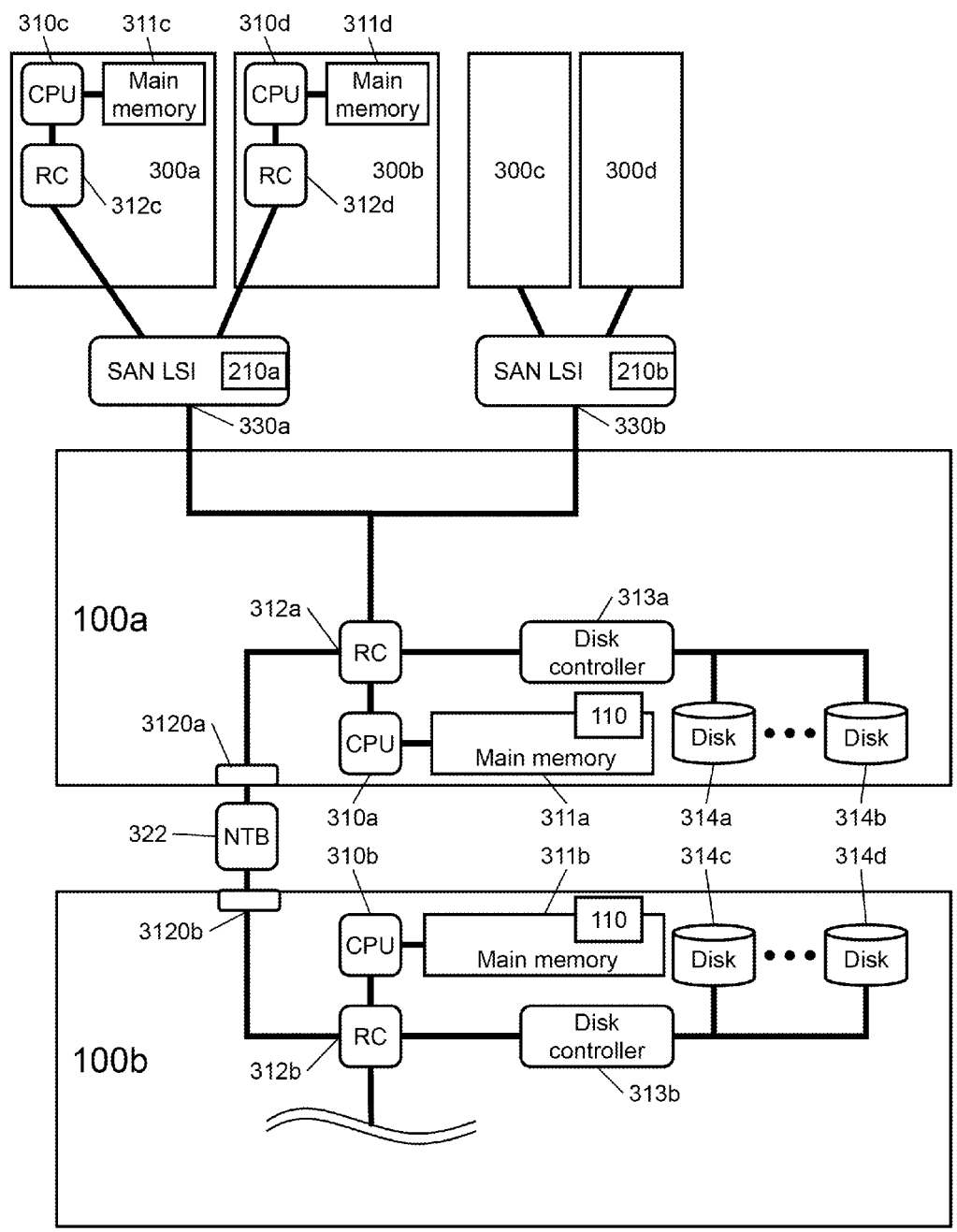
FIG. 25 shows a detailed configuration example of a computer system according to a third embodiment.

FIG. 25 shows a detailed configuration example of a computer system according to the third embodiment.

As the apparatus having the functions of both the HBA (320) and the TBA (321), SAN LSI (330) is employed. The SAN LSI (330) is an example of a relay node. In this example, the server (300) may be a virtual server. In that case, the SAN LSI (330) provides a plurality of virtual hardware interfaces to one physical server (300), and virtualization management software (for example, a hypervisor) in the physical server (300) allocates the virtual hardware interface to the virtual server (300) in the physical server (300). The server (300) and the storage (100a) may be communicably coupled to each other by a PCI-Express.

In this example, since the SAN LSI (330) provides the hardware interface similar to the HBA (320) to the server (300) and provides the hardware interface similar to the TBA (321) to the storage (100), the operation flow is not changed. The switch of the SAN is virtually achieved inside the LSI (330). The port ID allocation unit (210) may achieve the corresponding function by hardware serving as a mechanism of the SAN LSI (330) or a program by the processor in the SAN LSI.

Figure 26:
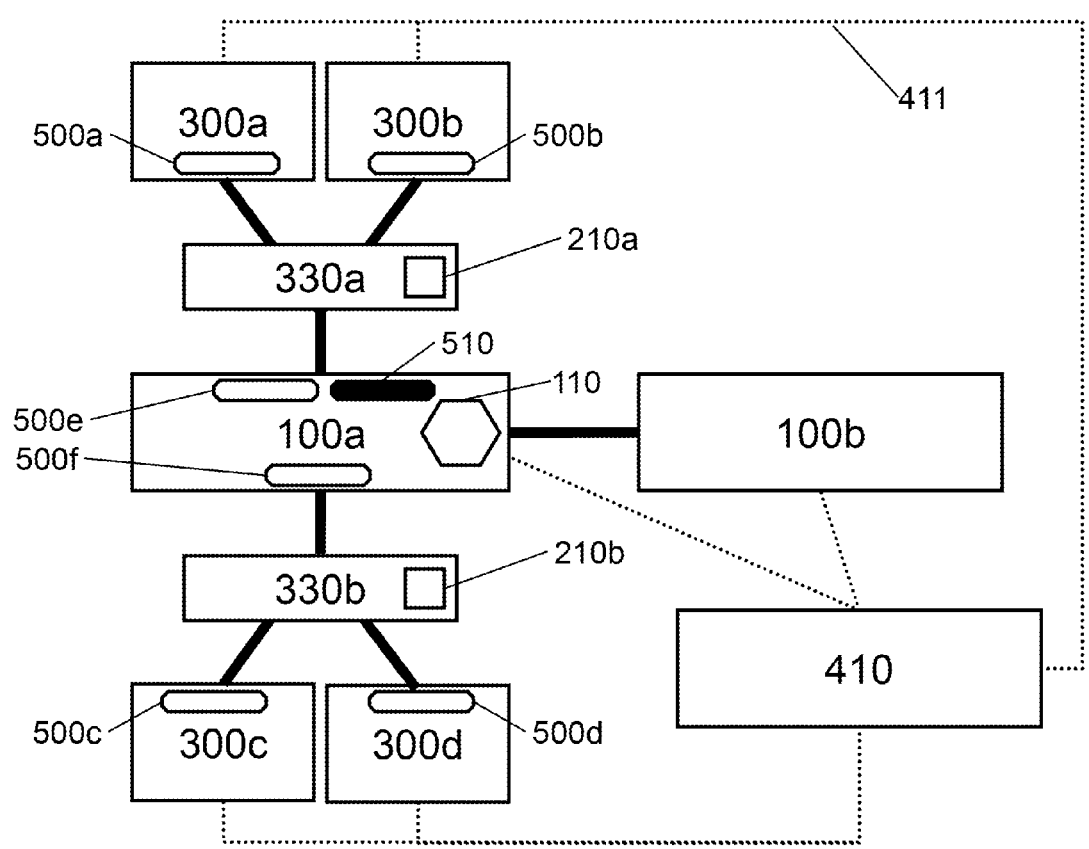
FIG. 26 shows a configuration example of a computer system according to a third embodiment.

In the second embodiment, the management apparatus (410) gives the storage number and the path number of the storage (100a) to the switch (200) through the management path (411). However, in this embodiment, as shown in FIG. 26, the management path (411) directly coupled to the SAN LSI (330) is not present. Thus, in the third embodiment, the storage number and the path number are imparted from the management apparatus (410) to the SAN LSI (330) through the server (300).

A different point between the operation flow of the switch (SAN LSI (330)) and the operation flow of the switch (200) in the second embodiment will be described below. In step 2001, the LSI (330) receives the storage number (501) and the path number (502) of the storage (100a) from the management apparatus (410) in an interface initialization process with the server (300). The rest of the operation flow is the same as in the second embodiment.

In place of the SAN LSI (330) in the third embodiment, an LSI (apparatus having both an interface of a server and an interface of a storage) of a network except for the SAN may be employed.

Although the several embodiments have been described above, the present invention is not limited to these embodiments.

For example, in place of a mixture of a server and a storage serving as an edge node in a network system, all edge nodes included in the network system may be servers or storages.

For example, to the storage (100a), in addition to the first additional storage (100b), a second additional storage may be coupled. In that case, to the storage (100a), in addition to a first proxy port ID for the first additional storage (100b), a second proxy port ID for the second additional storage is allocated.

For example, the second additional storage (100b) may be coupled not to the storage (100a) but to the first additional storage (100b) (each of the storages (100) may have a forwarding unit). That is, the storage (100a), the first additional storage (100b), and the second additional storages may be coupled to in series with each other. In this case, the second proxy port ID for the second additional storage may be allocated to all the storages (100a and 100b) on the upstream side of the second additional storage.

For example, the additional node may be coupled to an edge node that is the same in type as the additional node, and the additional node may be coupled to an edge node that is different in type from the additional node. In the former case, for example, when the additional node is a storage, an additional storage is coupled to the storage. In the latter case, for example, when the additional node is a server, an additional storage is coupled to the server.

For example, the additional node may be an intermediate node. That is, an edge node may be indirectly coupled to an edge node of a closed network. More specifically, the intermediate node may be coupled to the edge node of the closed network, and one or more edge nodes may be coupled to the intermediate node.

The invention claimed is:

1. A computer system, comprising:
a network system configured by a plurality of edge nodes and an intermediate node that relays communication between the edge nodes; and
a network address management unit being configured to allocate, to the first edge node, a first network address on which a physical configuration of a first edge node serving as any one edge node of the plurality of edge nodes is reflected,
the network address management unit being configured to, when a second edge node serving as an additional edge node is coupled to the first edge node, allocate, to the first edge node, a second network address on which the physical configuration of the first edge node is reflected with respect to the second edge node.

2. The computer system according to claim 1, wherein
the network address management unit is configured to receive a first path ID serving as an ID of a first path coupled to the intermediate node in the first edge node,
the network address management unit is configured to receive a first allocation request and generate the first network address including the first path ID, and
the network address management unit is configured to receive a second allocation request that designates a second path ID serving as an ID of a second path coupled to the second storage in the first edge node and generate the second network address including the second path ID.

3. The computer system according to claim 2, wherein
the network address management unit is configured to receive a first node ID serving as an ID of the first edge node, the network address management unit is configured to generate the first network address including the first node ID besides the first path ID, the second allocation request is configured to designate a second node ID serving as an ID of the second node besides the second path ID, and the network address management unit is configured to generate the second network address including the second node ID besides the second path ID.

4. The computer system according to claim 3, wherein the network address management unit is configured to allocate a plurality of first network addresses to the plurality of edge nodes, respectively, and each of the plurality of first network addresses and the second network address is configured to include unique information serving as information that is unique in the plurality of first network addresses and the second network address.

5. The computer system according to claim 3, wherein the first edge node is configured to receive a packet that designates the first or second network address as a destination network address through the intermediate node from a third edge node serving as any one edge node, except for the first edge node, of the plurality of edge nodes, depending on whether a node ID in the destination network address designated by the received packet is the second node ID or the first node ID, determine whether the received packet is transferred to the second edge node, and discriminate a transfer destination path in the first edge node based on a path ID in the destination network address designated by the received packet.

6. The computer system according to claim 2, wherein each of the first and second path IDs is a slot ID of a PCI express bus in the first edge node.

7. The computer system according to claim 1, wherein each of the first and second network addresses is a port ID of a Fibre Channel network.

8. The computer system according to claim 1, wherein the first edge node and the second edge node are coupled to each other by using a PCI express bus and a bus direct coupling device.

9. The computer system according to claim 8, wherein the bus direct coupling device is an NTB (NON-Transparent Bridge).

10. The computer system according to claim 1, wherein the intermediate node has the network address management unit.

11. The computer system according to claim 1, further comprising a management apparatus that manages each of the plurality of edge nodes, and wherein the management apparatus has the network address management unit.

12. The computer system according to claim 1, wherein the first and second edge nodes are storages, and two or more edge nodes, except for the first edge node, of the plurality of edge nodes are servers that transmit input/output requests.

13. An address management apparatus, comprising:

an interface unit that is coupled to each of a plurality of edge nodes included in a network system; and a control unit that is coupled to the interface unit, the control unit being configured to allocate, to the first edge node, a first network address on which a physical configuration of a first edge node serving as any one edge node of the plurality of edge nodes is reflected, and when a second edge node serving as an additional edge node is coupled to the first edge node, allocate, to the first edge node, a second network address on which the physical configuration of the first edge node is reflected with respect to the second edge node.

14. An edge node that is any one of the plurality of edge nodes included in a network system, the edge node comprising:

a first interface unit that is coupled to an address management apparatus serving as a management apparatus that manages each of intermediate nodes or the plurality of edge nodes included in the network system;

a second interface unit to which an additional edge node outside the network system is coupled; and a control unit that is coupled to the first and second interface units, the control unit being configured to transmit information representing a physical configuration of an edge node to the address management apparatus, transmit a first allocation request to the address management apparatus and receive allocation of a first network address on which the physical configuration represented by the information is reflected in response to the first allocation request, when the additional edge node is coupled to the second interface unit, transmit a second allocation request with which information representing a physical configuration of an edge node is associated with respect to the additional edge node to the address management apparatus, and, in response to the second allocation request, receive allocation of a second network address on which a physical configuration represented by information associated with the second allocation request is reflected, and when a packet that designates the first or second network address as a destination network address is received from any one of the plurality of edge nodes, determine whether the received packet is transferred to the additional edge node based on the destination network address designated by the received packet and discriminates a transfer destination path in the edge node.

* * * * *